(12) United States Patent
Meurer

(10) Patent No.: US 6,783,009 B1
(45) Date of Patent: Aug. 31, 2004

(54) SOLELY-BENT BAFFLE FOR LIQUID TREATMENT BASIN

(75) Inventor: Charles Lonnie Meurer, Golden, CO (US)

(73) Assignee: Meurer Industries, Inc., Golden, CO (US)

( * ) Notice: Subject to any disclaimer, the term of this patent is extended or adjusted under 35 U.S.C. 154(b) by 0 days.

(21) Appl. No.: 10/154,902

(22) Filed: May 24, 2002

(51) Int. Cl.[7] .............................................. B01D 21/00
(52) U.S. Cl. ..................................... 210/521; 210/541
(58) Field of Search ................................. 210/521, 522, 210/541, 542

(56) References Cited

U.S. PATENT DOCUMENTS

| | | | | |
|---|---|---|---|---|
| 3,529,728 A | * | 9/1970 | Middelbeek et al. | 210/522 |
| 4,039,449 A | * | 8/1977 | Soriente | 210/522 |
| 4,405,459 A | * | 9/1983 | Smith | 210/521 |
| 4,889,624 A | * | 12/1989 | Soriente et al. | 210/522 |
| 5,397,472 A | * | 3/1995 | Bouchard | 210/521 |
| 5,736,037 A | * | 4/1998 | Meurer | 210/541 |
| 5,904,850 A | * | 5/1999 | Vellinga | 210/521 |

OTHER PUBLICATIONS

Strongwell Brochure "Fiberglass Baffle Panels", 2 pages, dated at least as early as May 23, 2001.
Enduro Brochure "Fiberglass Baffle Wall Systems", 4 pages, dated at least as early as May 23, 2001.

* cited by examiner

Primary Examiner—Christopher Upton
(74) Attorney, Agent, or Firm—C. E. Martine, Jr.

(57) ABSTRACT

A baffle has no shape-holding facilities other than bends that define and hold the configuration of structural channels, and controls the flow of liquid in basins of liquid treatment equipment. Methods provide an unbent blank for making such baffle, and provide operations for bending such unbent blank to provide such baffle. A preferably stainless steel unbent baffle blank may be deformed by the bending operation into a configuration that defines the plurality of structural channels of the baffle. The deformed blank need not be held bent in such configuration by any fastener or welding. The plurality of structural channels render the baffle able to withstand the various forces applied to the baffle by incoming liquid and by liquid having a reverse flow direction in the basin.

33 Claims, 17 Drawing Sheets

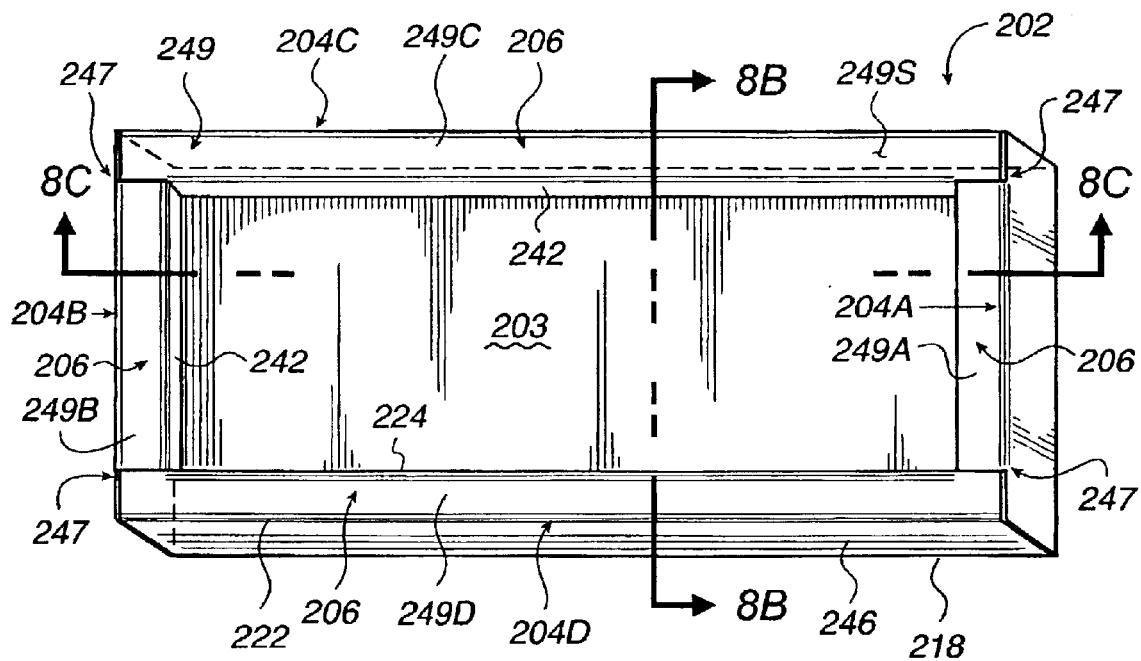
Fig. 8A
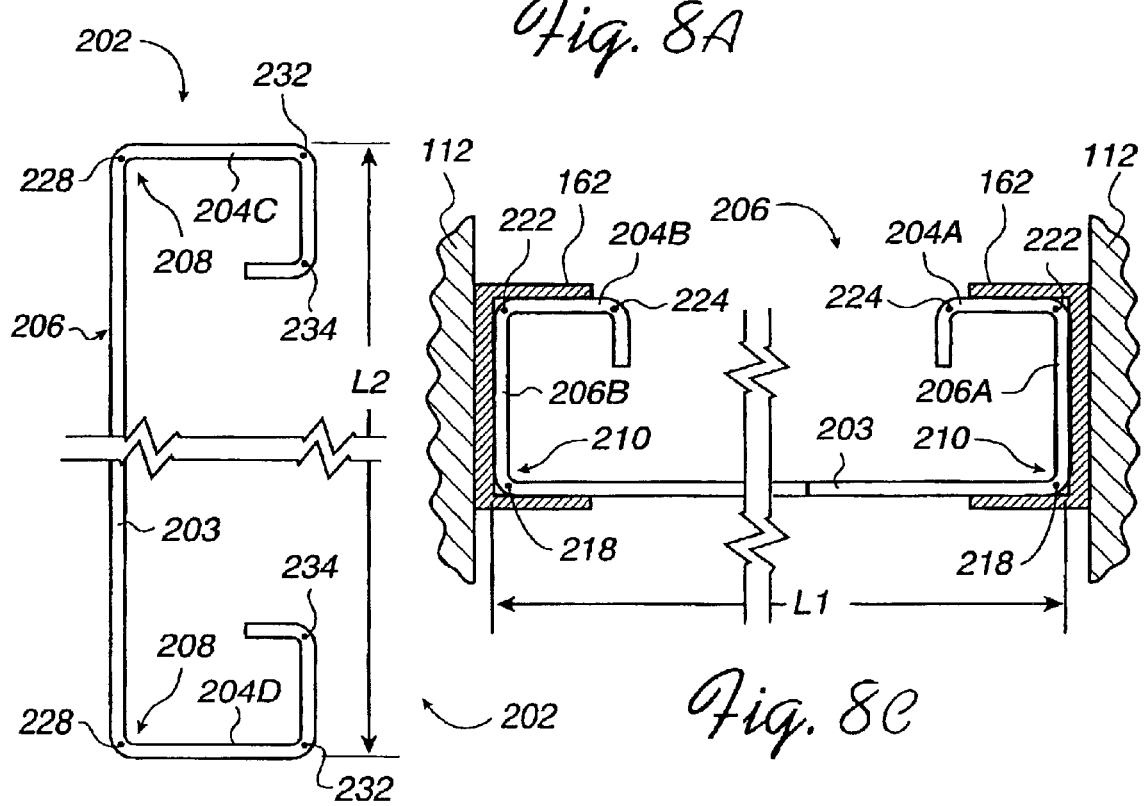
Fig. 8B
Fig. 8C

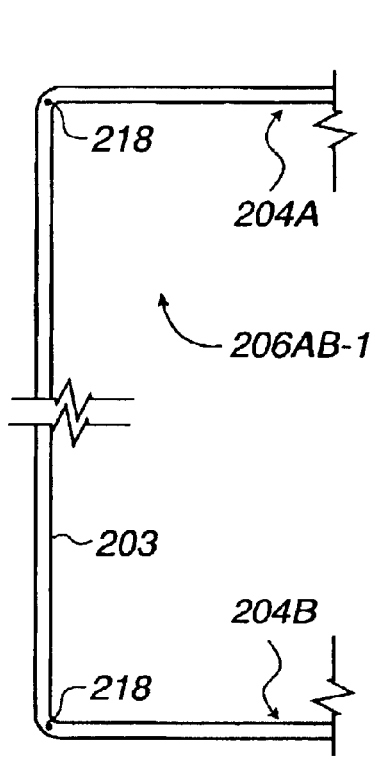
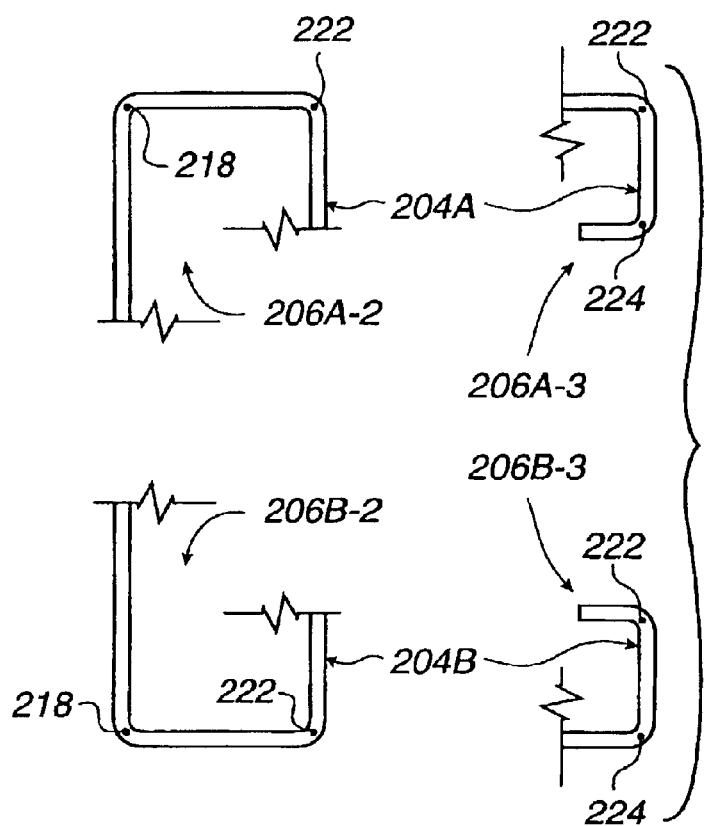
Fig. 8D  Fig. 8E  Fig. 8F
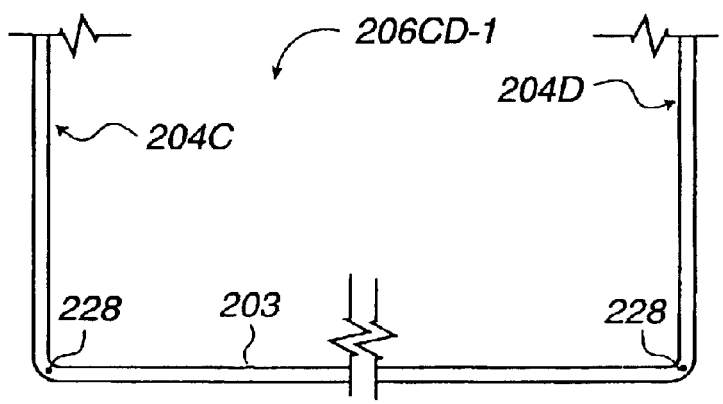
Fig. 8G

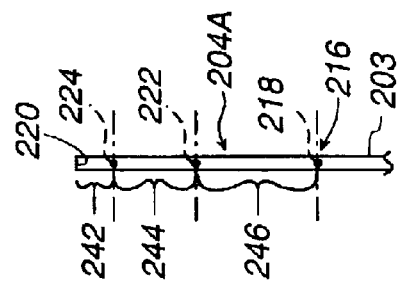
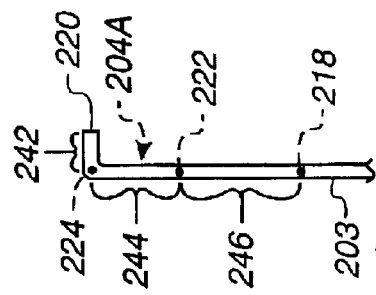
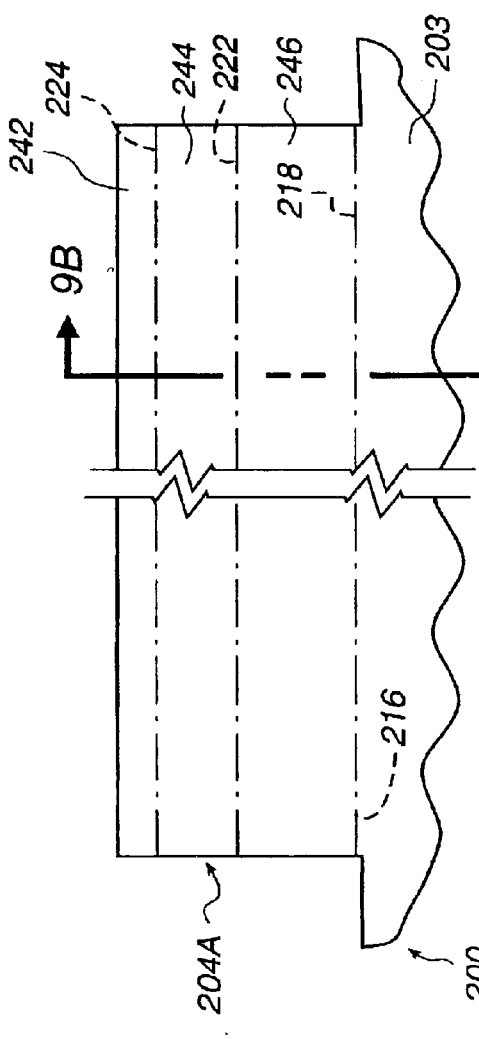
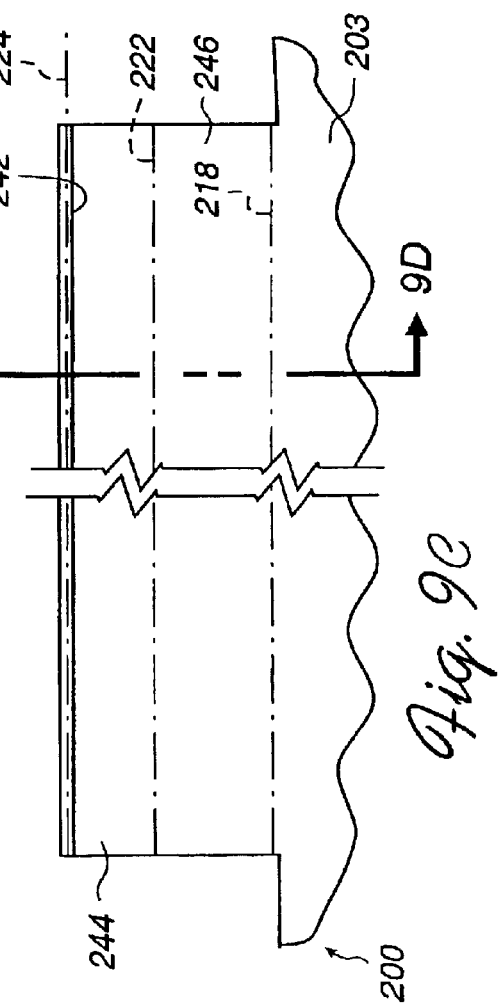

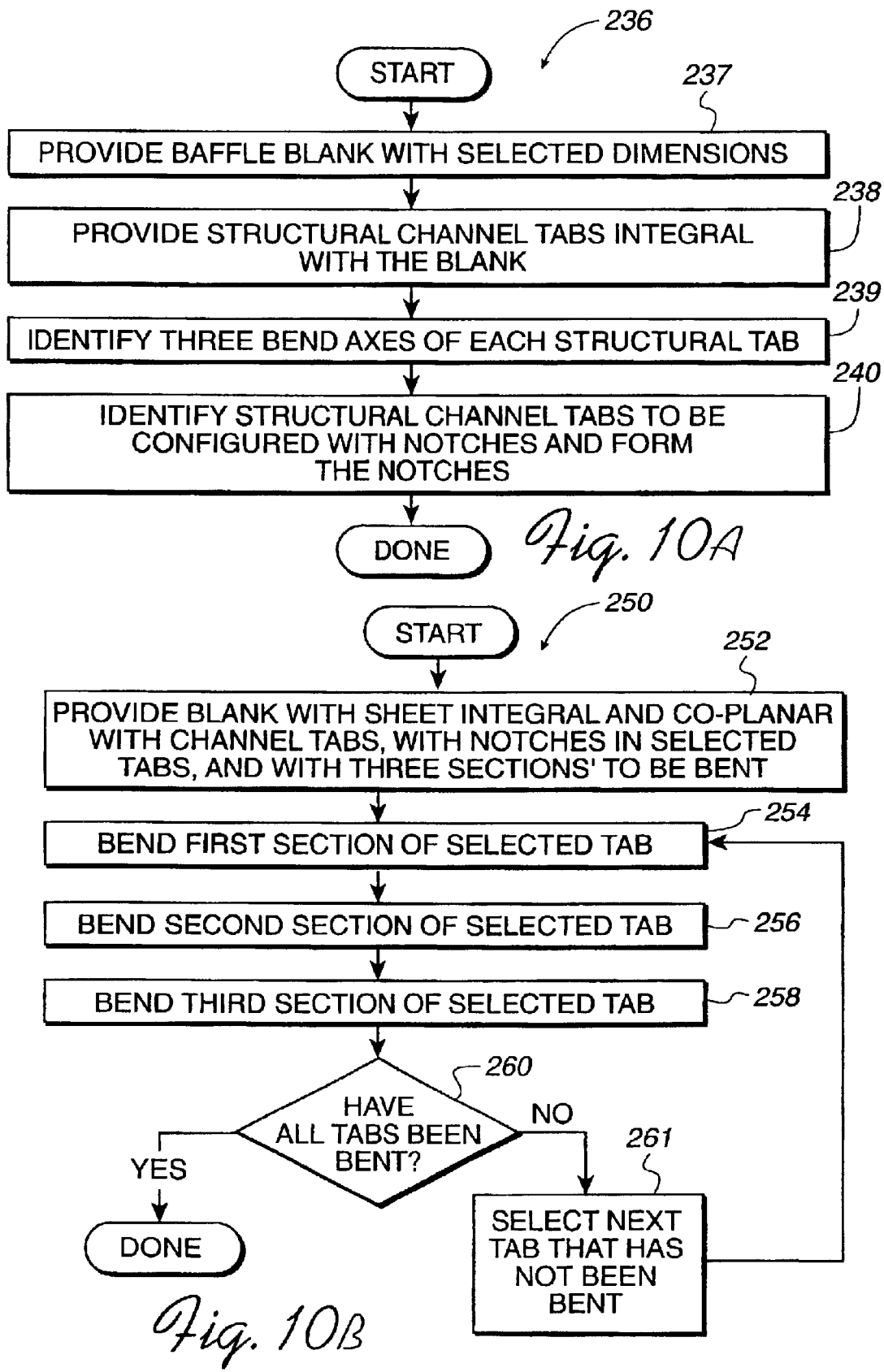

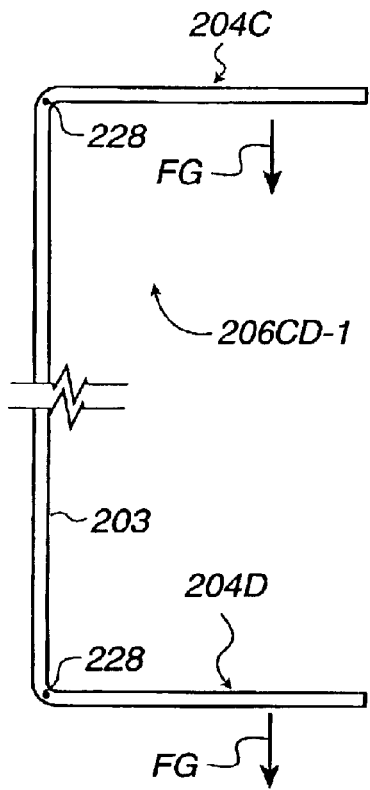
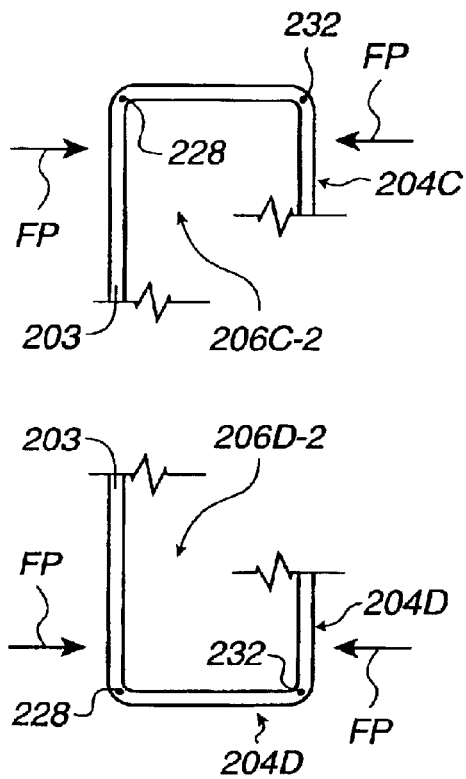
Fig. 12A
Fig. 12B
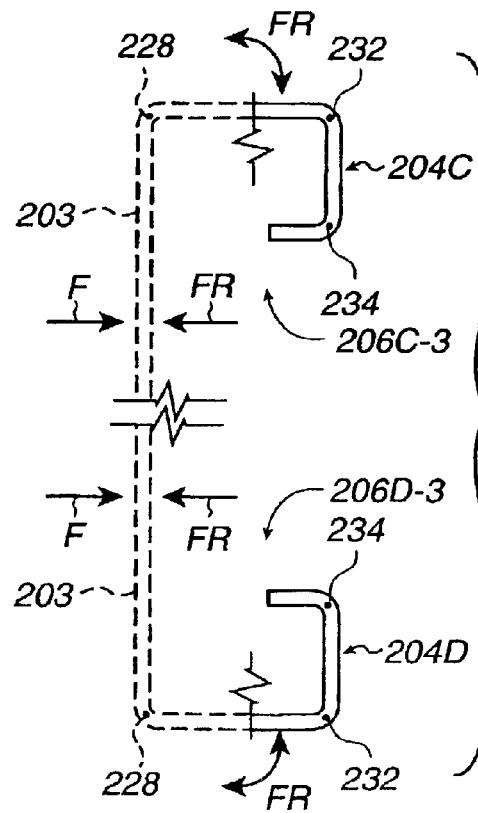
Fig. 12C

SOLELY-BENT BAFFLE FOR LIQUID TREATMENT BASIN

BACKGROUND OF THE INVENTION

1. Field of the Invention

The present invention relates generally to controlling the flow of liquid in liquid treatment equipment, and more particularly to providing a solely-bent baffle, having no shape-holding facilities other than bends that form structural channels or beams, for controlling the flow of the liquid in equipment for processing liquid, and to methods of providing an unbent baffle blank, and to methods for bending an unbent baffle blank to provide the solely-bent baffle.

2. Description of the Related Art

Liquid flows into liquid treatment equipment in which the liquid is subjected to various processing operations. The processing operations may be of the contact-type or of a physical-type, for example. The contact-type may include, for example, processes in which the liquid is contacted with a chemical (e.g., for chlorinization or flocculation), or in which the liquid is mixed by energy imparted to the liquid, or in which the liquid is aerated by one or more gasses introduced to the liquid. In each contact process situation, a container 100, such as a three-dimensional container shown in FIGS. 1A and 1B, is provided to receive liquid (see arrows 102) to be processed and to provide a volume in which the contact processing may take place. Chemicals such as chlorine (see arrows 104) may, for example, be supplied to the container 100 from a pipe or other inlet 106. For proper processing, in many cases it is necessary to control the flow of the liquid 102 within the three-dimensional container 100. Such control may be of the direction of the liquid 102, as by using flow controllers, also known as baffles, 110, for example, which may extend between opposed walls 112 of the container 100. The direction of liquid flow may be from an inlet 114 downwardly under a first of the baffles 110-1 (FIG. 1B) and upwardly over a second of the baffles 110-2. Alternatively, FIGS. 2A and 2B show that for processing, baffles 110-3 and 110-4 may extend partially between the walls 112 so as to leave spaces 116 so that the liquid flow is toward one wall 112-1 and then toward the other wall 112-2. For mixing of the liquid 102, FIGS. 2A and 2B show a mechanical mixer 118 between the baffles 110-3 and 110-4. In another variation, the flow rate of the liquid 102 may be controlled as shown in FIGS. 3A and 3B by vertical baffles 110-5 and 110-6 having spaced openings 120, and for example, an aerator 122 may provide gas 124 that contacts the liquid 102. In each illustrated use of the baffles 110, a forward force (see arrows FF) may be applied by the liquid 102 against the baffle 110. The direction of liquid flow may also be reversed. In this case, the flow of liquid 102 that normally exits an outlet 122 may flow (see arrows 124) into the container 100 via the outlet 122 and apply a reverse force (see arrows FR) to the flow controller 110.

An example of such physical-type of liquid treatment equipment is a clarifier 130 shown in FIGS. 4A and 4B for removing materials 132 (FIG. 4B) from the liquid 102. These materials 132 are generally in the form of particles suspended in the liquid 102. The particles can be removed from the liquid 102 under the force of gravity when the flow of the liquid 102 is substantially reduced, as in a very low flow rate zone 134 in the clarifier 130. Since these materials 132 are generally solid and are said to "settle" out of the liquid 102, they are referred to as "settleable solids". Such settleable solids 132 may include naturally occurring materials (e.g., clay, silt, sand and dirt), chemical precipitants and biological solids. The word "solids" as used herein to describe the present invention refers to such settleable solids 132. Also, since the settleable solids 132 "settle" out of the liquid 102, the clarifiers 130 are often referred to as "settlers".

Clarifiers 130 are used, for example, to treat liquid 102 in water and waste water treatment plants. In water treatment, the water 102 drawn from a water supply has various non-settleable colloidal solids therein. When mixed with the chemicals 104 (FIG. 4A) in the contact-type of processing, the colloidal solids and chemicals agglomerate to form solids 132. In waste water treatment, the solids include organic solids, among other wastes. Water and waste water may be the liquids 102 treated in the clarifiers 130 to remove such solids 132, thereby making the water clear and suitable for use, reuse, or for further treatment, such as tertiary treatment. The word "liquid" as used herein to describe the present invention refers to water and waste water 102, and to other liquids which may be subjected to the contact-type processes described above. Because of the nature of such use or reuse, during treatment such liquids 102 must not receive any chemicals or other materials that are toxic to humans, for example.

Continuing to refer to the exemplary clarifiers 130, the very low flow rate zones 134 promote maximum settlement of the settleable solids 132 to a bottom 136 of the clarifiers 130. Clarifiers 130 typically include containers 100 (FIG. 4A) that are typically referred to as detention basins where the settlement of the solids 132 occurs. For convenience, the term "basin" as used herein includes such three-dimensional containers 100 and such detention basins 100, and any similar containers (e.g., circular in shape) in which such contact-type or physical-type processing is performed.

Tubes or flat plates 138 mounted at fixed or variable angles relative to the surface of the liquid 102 have been used to form multiple ones of the very low flow rate zones 134 in the detention basins 100. The liquid 102 containing the settleable solids 132 flows into the detention basin 100 and must be directed to the bottom 136 of the basin 100 for flow upwardly in the flow zones 134 at flow rates that generally are slow enough to allow sufficient time for most of the settleable solids 132 to settle out of the liquid 102. As a result, most of the settleable solids 132 will have settled onto the plates or tubes 138 by the time the liquid 102 has flowed to tops 142 of the plates or tubes 138.

In the past, for both the contact-type and the physical-type of processing, liquid 102 flowing into such detention basin 100 for treatment has generally been controlled by providing one of two types of the flow controllers 110 across the opposite, vertically-extending walls 112 of the basin 100. Such incoming liquid 102 generally moves through the inlet 114 of the basin 100, and from the inlet 114 in a forward direction (see arrow 146 in FIG. 4B), generally parallel to the opposite, vertical walls 112. The prior flow controllers 110 extend across the opposed, vertical sides 112 and generally have a height H (FIG. 4B) less than the depth D of the liquid 102 in the basin 100, such that there is a space, or opening, 148 between the bottom 150 of the prior flow controllers 110 and the bottom 136 of the basin 100. The prior flow controllers 110 block the forward flow 146 of the liquid 102 that is above the bottom 150 of the flow controllers 110. However, the opening 148 allows the incoming liquid 102 to flow under the flow controllers 110 and into entrances 152 of the low flow zones 134, the entrances 152 being provided near the bottom 136 of the basin 100.

One type of such prior flow controller 110 is a slab of reinforced concrete generally formed in one piece extending across the opposed walls 112 and providing the opening 148 above the bottom 136 of the basin 100 for forward liquid flow to the entrances 152. The slab is formed by pouring the concrete in place in the basin 100. Over time, the concrete slab of the prior flow controller 110 deteriorates under the action of the incoming liquid 102 and the materials 132 carried by the incoming liquid 102, and must be removed and replaced. Since the concrete slab of the prior flow controller 110 may, for example, be as wide as ten feet, as high as twenty feet, and as thick as eighteen inches, the concrete slab of the prior flow controller 110 is very heavy. As a result, removal of the concrete slab of the prior flow controller 110 both requires use of costly equipment that is time-consuming to use, and increases the risk of injury to the staff that provides maintenance services for the basin 100.

Referring to FIGS. 5A and 5B, in an attempt eliminate the need for such costly equipment, for example, the concrete slabs of the prior flow controllers 110 have been replaced using boards 160 made of redwood. It has been typical for each opposite wall 112 to be provided with a vertically-extending bracket 162, and for the individual redwood boards 160 to be bolted to the brackets 162. Although the redwood boards 160 are easier to install than the concrete slabs, to minimize twisting the boards 160 have typically been made from so-called "clear, all-heart" lumber that is both rare and costly. Further, such redwood boards 160 also require maintenance that involves removal of the boards 160. For example, in use the boards 160 become saturated with the liquid 102 in which the boards 160 are constantly immersed, causing difficulties when attempts are made to remove the boards 160. Each liquid-saturated redwood board 160 is heavy and difficult to lift without use of a mechanical hoist. In an attempt to reduce costs, some have used lesser grades of redwood (other than the "clear, all-heart" grade) to make the boards 160. However, to overcome the decreased quality of the lesser grades, some have improperly treated the lesser-grade redwood boards 160 with arsenic, for example, which is highly toxic and therefore prohibited by applicable regulations for use in liquid 102 intended for human consumption.

FIG. 6 shows how the flow controllers 110 have in the past been provided in the containers 100 when the walls 112 are relatively widely spaced apart, as by twenty feet for example. In this case, separate sections 110S of the flow controller 110 may be provided. For each section 110S, the brackets 162 described with respect to FIG. 5A may be attached to the walls 112, or as shown, a concrete pier 164 may be installed vertically next to the wall 112, and the bracket 162 secured to the pier 164. To allow the boards 160 to be used in standard ten foot lengths for one section 110S, a central pier 166 has been secured by bolts to the bottom 136 (FIG. 4B) of the basin 100 between the walls 112. The pier 166 extends upwardly to provide support in the center of the basin 100. The central piers 166 have been made from stainless steel, for example, and may be secured to brackets 162 in the form of U-shaped slots which receive opposite ends of the boards 160. The boards 160 thus extend horizontally between the brackets 162 and are supported by the central pier 166 against the respective forward and reverse forces FF and FR of the flowing liquid 102. Although the boards 160 may thus be used across such widely spaced walls 112, the boards 160 are still subject to the above-described maintenance problems.

Therefore, what is needed is a way of providing an improved flow controller, or baffle, for use in liquid treatment equipment. In particular, what is needed is a baffle having a long useful life when constantly immersed in liquid to be treated, which life is long relative to that of the reinforced concrete flow controllers and the flow controllers made from clear, all-heart grade redwood. Also, what is needed is an improved flow controller that is more easily and safely removable from the equipment than the reinforced concrete flow controllers and the flow controllers made from clear, all-heart grade redwood. Further, what is needed is a method of fabricating an improved flow controller having all such benefits lacking in the prior reinforced concrete flow controllers and the prior flow controllers made from clear, all-heart grade redwood.

SUMMARY OF THE INVENTION

Broadly speaking, the present invention fills these needs by providing a flow controller, referred to below as a "baffle", having no shape-holding facilities other than bends that define and hold the shape, or configuration, of structural channels, wherein the baffle may control the flow of the liquid in any of the above-described liquid treatment equipment, e.g., for the contact-type or the physical-type of processes. The present invention also fills these needs through methods of providing an unbent blank for making such baffle, and by providing operations for bending such unbent blank to provide such baffle. In particular, the present invention fills these needs by providing a preferably stainless steel unbent baffle blank that may be deformed by bending into a configuration that defines a plurality of structural channels of a baffle, wherein the deformed blank need not be held bent in such configuration by any fastener or welding, for example, and wherein the plurality of structural channels render the baffle able to withstand the various respective forces FF and FR, for example, applied to the baffle by the respective incoming liquid and by liquid having a reverse flow direction in the basin. Importantly, without use of such welding or such fasteners, the deformed baffle remains in the desired bent configuration notwithstanding such forces FF and FR applied to the baffle during the flow control operation of the baffle. Such bent baffle (that is not welded or fastened or otherwise secured in the desired configuration) is thus referred to as a "soley-bent" baffle to indicate, or describe, the structural characteristic of only being bent into a configuration implementing the desired plurality of structural channels, and to indicate, or describe, the structural characteristic of staying in such bent configuration without being retained in such configuration by welds or fasteners, or by any other structure added to the bent material from which the blank baffle is made. As a result, the solely-bent baffle does not have any corrosion sites that are typically found adjacent to locations at which welds are made. Such corrosion sites are characterized by chemical deterioration (even in stainless steel) and tend to isolate or focus stress, and over time are sites of deterioration of the baffle. Also, the solely-bent baffle does not have any holes to allow a fastener to extend through the baffle, such that there is no weakening of the solely-bent baffle by such holes and no tendency of normal operational vibrations to cause a fastener to become loose. The absence of such welds and holes and fasteners increases the potential period of time during which the soley-bent baffle may remain in service without maintenance (e.g., removal and replacement). Additionally, because the solely-bent baffle does not absorb the liquid and thus does remain in an original relatively light-weight condition (as compared to concrete or liquid-saturated redwood), any required maintenance may be easier and safer to perform using maintenance staff rather than costly hoists or other lifting equipment.

Other aspects and advantages of the invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings, in which like reference numerals designate like structural elements.

FIG. 8A is a perspective view illustrating tabs of the blank, wherein the tabs are bent to form the baffle of the present invention having soley-bent structural channels;

FIG. 8B is a cross-sectional view taken along line 8B—8B in FIG. 8A, illustrating two opposed side tabs and the blank defining five of the structural channels of the baffle;

FIG. 8C is a cross-sectional view taken along line 8C—8C in FIG. 8A, illustrating two opposed end tabs and the blank defining five of the structural channels of the baffle;

FIGS. 8D, 8E and 8F depict portions of the baffle shown in FIG. 8C to separately show the five channels;

FIGS. 8G, 8H and 8I depict portions of the baffle shown in FIG. 8B to separately show the five channels;

FIGS. 9A through 9H depict an end tab in successive stages of being bent to form a plurality of the soley-bent channels;

FIGS. 10A and 10B illustrate flow charts of methods of the present invention for respectively providing the blank, and configuring the blank with the plurality of structural channels;

FIGS. 12A, 12B, and 12C are cross-sectional views of the side tabs similar to the end tabs shown in FIGS. 8D, 8E, and 8F, showing forces applied to the baffle, wherein the baffle resists the forces;

DETAILED DESCRIPTION OF THE PREFERRED EMBODIMENTS

An invention is described for assuring flow control in a basin, and for filling the above-described needs by providing a baffle having no configuration-holding, or shape-holding, facilities other than bends that define and hold the shape, or configuration, of structural channels. The present invention also fills such needs by providing methods for forming unbent blanks for making such baffles, and by providing methods for bending such unbent blanks to provide such baffles. It will be obvious, however, to one skilled in the art, that the present invention may be practiced without some or all of these specific details. In other instances, well known process operations have not been described in detail in order not to obscure the present invention.

Figure 7A:
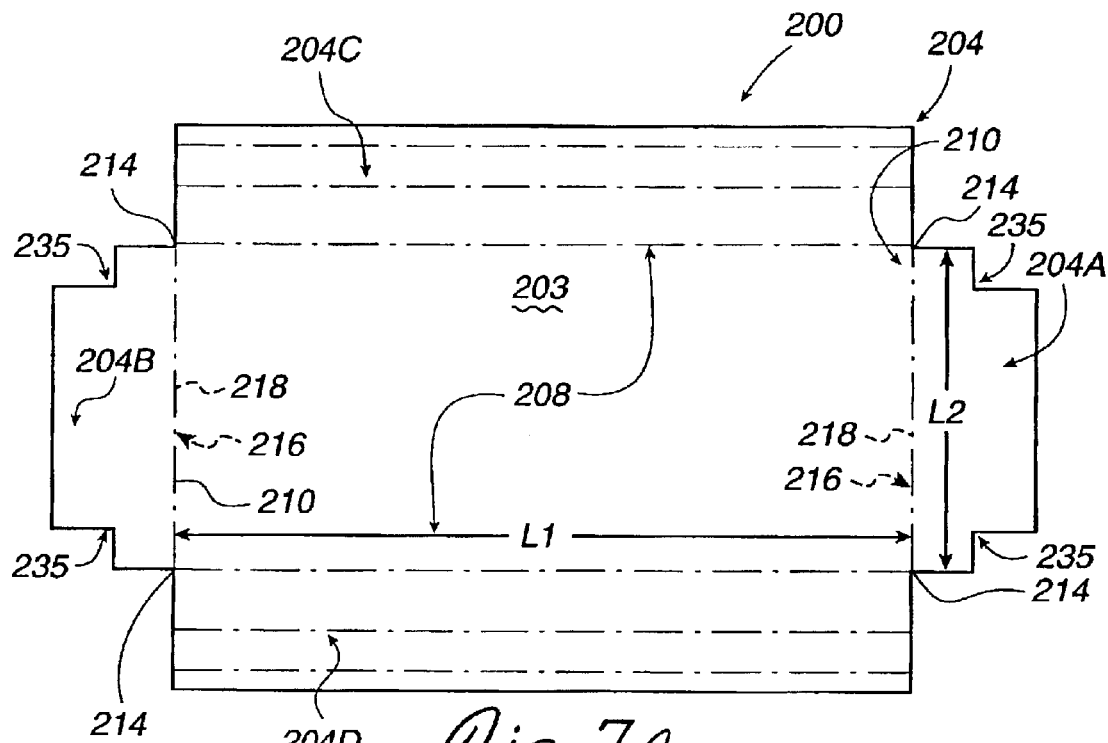
FIGS. 7A, 7B and 7C illustrate a blank of the present invention for making a baffle of the present invention having soley-bent structural channels.
Figure 7B:
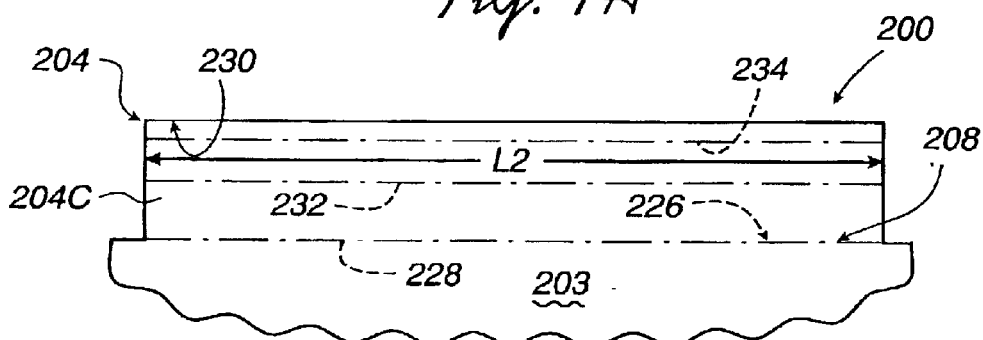
Figure 7C:
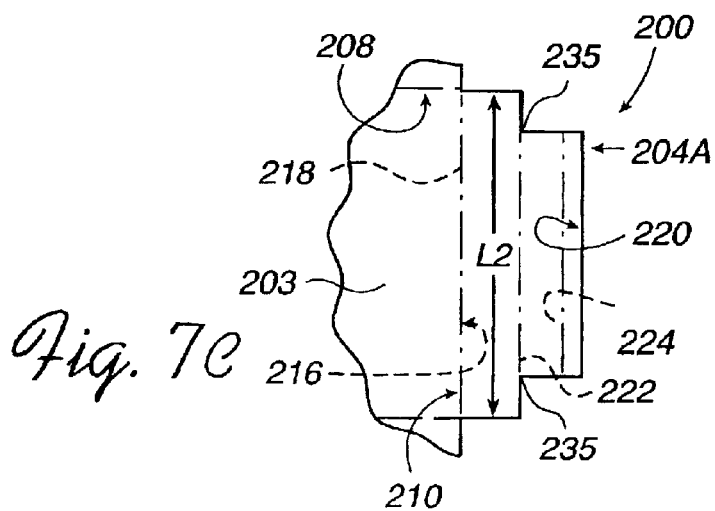

FIGS. 7A through 7C show a blank 200 of material for forming a baffle 202 (FIGS. 8A and 8B) of the present invention. The blank 200 is configured with a central sheet 203 and a plurality of channel tabs 204 (FIGS. 7A and 7B) to facilitate fabrication into the baffle 202. An exemplary four channel tabs 204 (shown as tabs 204A through 204D) may be provided integral with the sheet 203. FIGS. 8A and 8B show the baffle 202 with each of the tabs 204A through 204D having been bent into a configuration characterized by a plurality of structural channels 206 along each of opposite sides 208 (FIG. 7A) and each of opposite ends 210 (FIG. 7A) of the sheet 203. The structural channels 206 adapt the baffle 202 to withstand the plurality of forces F, FG, FP, and FR (FIGS. 12A through 12C), for example, which may be applied to the baffle 202 during use in the above-described basins 100, for example.

Figure 6:
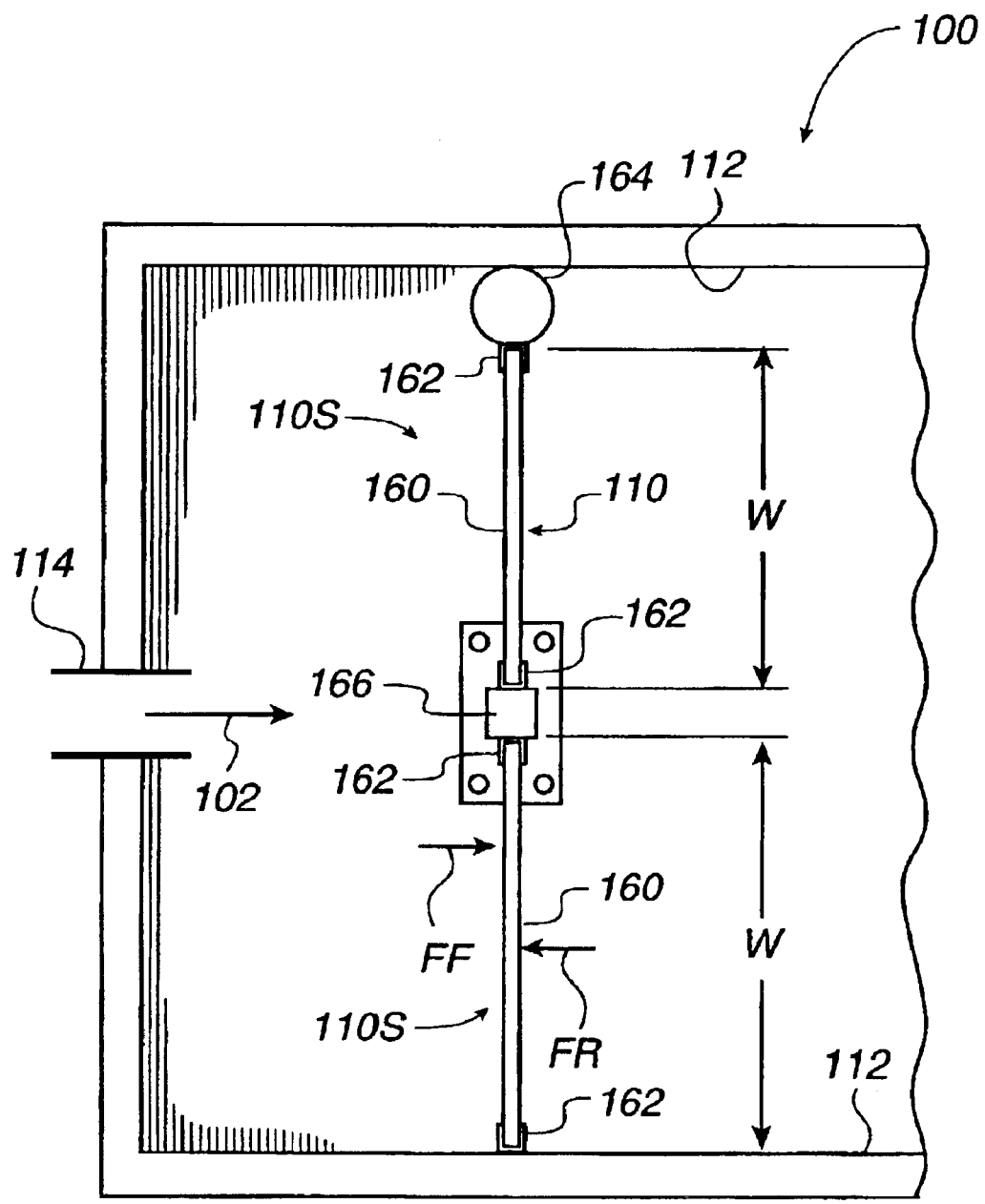

The blank 200 is shown in FIGS. 7A through 7C including the sheet 203 fabricated from a particular material, such as stainless steel. Although stainless steel is the preferred material due to its resistance to corrosion, for example, the blank 200 may be made from other materials, such as aluminum, or bendable plastic, e.g., plastic that can bend and hold a set (a bent shape), such as mechanical ABS. When the sheet 203 is configured from stainless steel, type T304 stainless steel having a thickness of 0.03 inches, for example, may be used. The sheet 203 has the opposite sides 208 that are identified by dash-dot-dash lines to indicate that the sides 208 may correspond to, or be the site of, bends, as is more fully described below. The sides 208 are configured with substantially equal first lengths L1 that may correspond to the width W of one of the above-described sections 110-1. Such width W, and thus such first length L1, may be in the range of from one foot to about ten feet, for example. Thus, when installed in the basin 100 in place of the prior ten foot boards 160 (FIG. 6), the baffle 202 will extend across the basin 100 completely between the opposite walls 112, or completely between the bracket, or slots, 162 of a section 110S, for example.

Figure 3A:
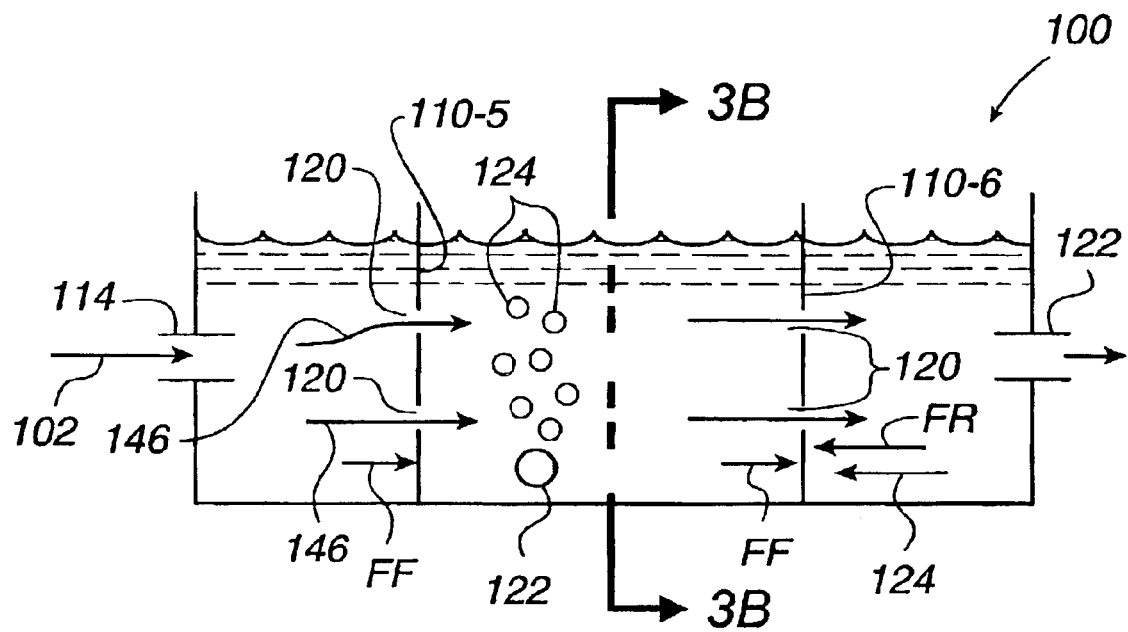
Figure 3B:
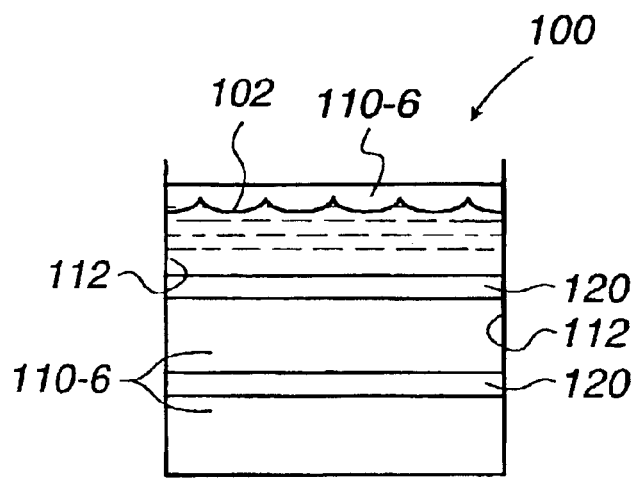
Figure 4A:
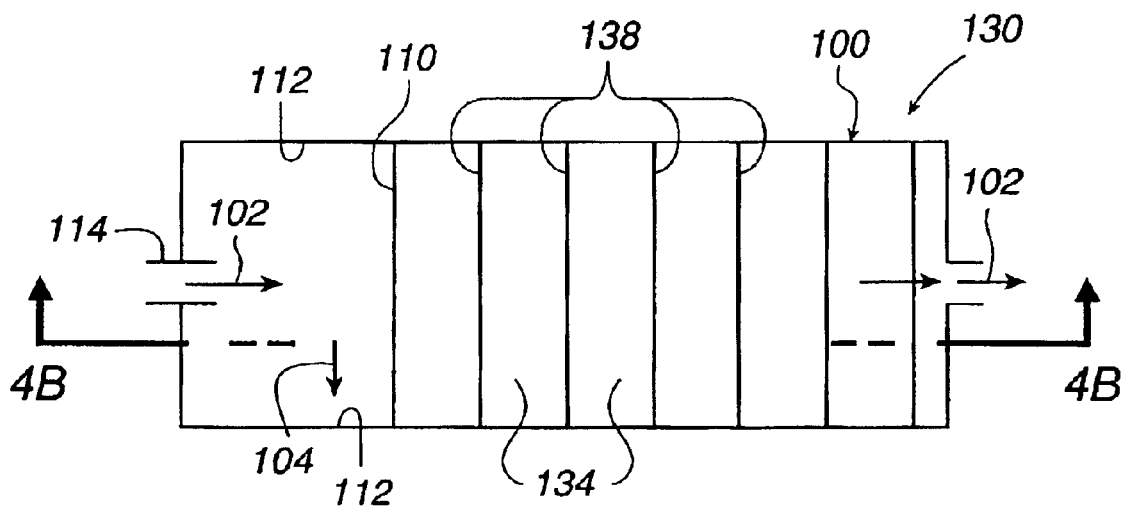
Figure 4B:
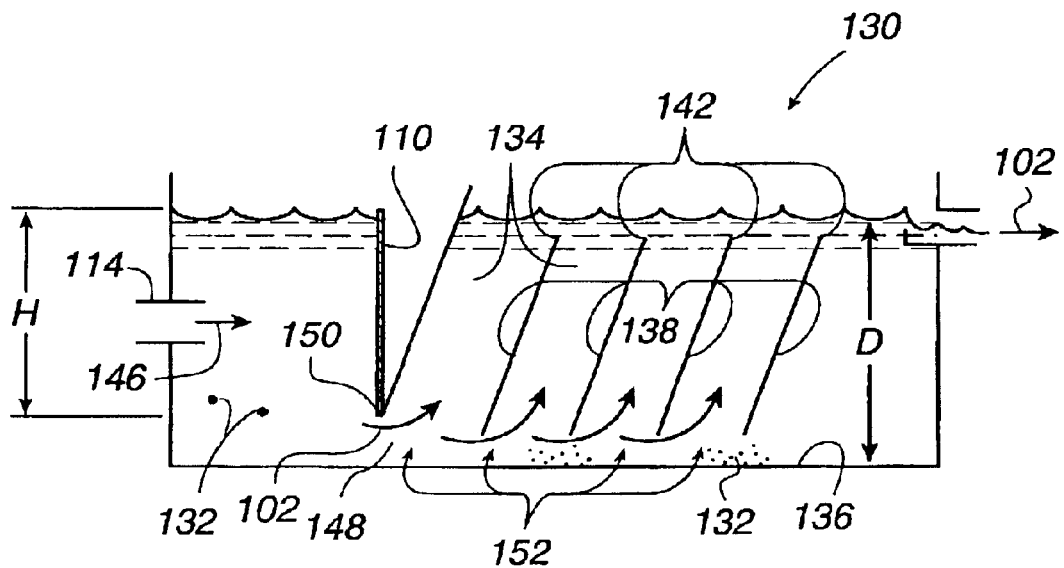
Figure 5A:
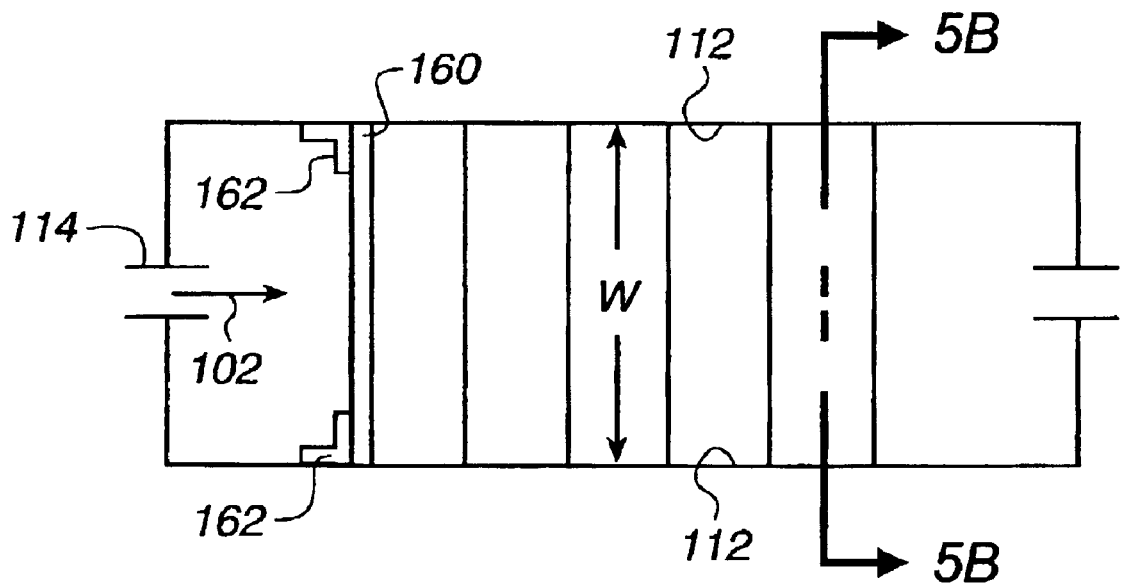
Figure 5B:
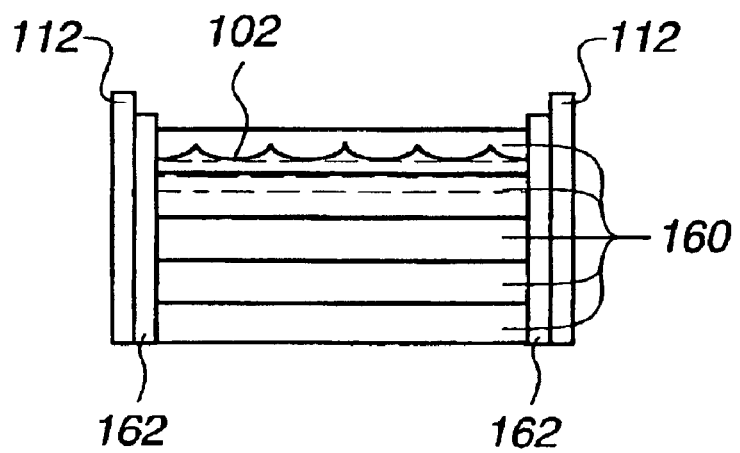

The sheet 203 is also configured with the opposite ends 210 that are also identified by dash-dot-dash lines to again indicate that the ends 210 may correspond to, or be the site of, bends, as more fully described below. The opposite ends 210 are configured with substantially equal second lengths L2. The second lengths L2 may individually be in a range of inches to about three feet, for example. Many of the baffles 202 may be arranged vertically, one above the other, with the bent tabs 204A and 204B in the slots 162 and may in combination have a height corresponding to the height H (FIG. 4B) of one of the flow controllers 110 that is used to block flow of liquid 102 in a section 110-1, for example. Thus, when many of the baffles 202 are installed in a basin 100 one above the other in place of the boards 160 (FIG. 6), the many baffles 202 and any spaced openings 120 (FIG. 3B) will in combination have the desired height H, which may be up to twenty feet, for example.

FIG. 7A shows that each adjacent one of the sides 208 and ends 210 are configured in perpendicular relationship and intersect to define a corner 214 of the blank 200. The blank 200 is configured with first, second, third and fourth ones of the corners 214. As described above, then, one configuration of the sheet 203 with the sides 208 and the ends 210 is a rectangular configuration. Depending on the values of L1 and L2, another configuration of the sheet 203 may be square, for example. The values of L1 and L2 may be selected according to the values of the width W and the height H of the basin 100, or of a section 110-1, for example, of a basin 100.

Regardless of the dimensional configuration of the sides 208 and of the ends 210 of the sheet 203, the sheet 203 is also configured with the plurality of the channel tabs 204A and 204B. For purposes of description, the channel tab 204A is identified as a first channel tab, and the opposing channel tab 204B is referred to as a second channel tab. As shown in FIG. 7C, the tab 204A is configured with a first proximal edge 216 integral with one of the ends 210. The tab 204B is similarly configured integral with the other end 210. These tabs 204A and 204B may be referred to as "end tabs". Each of the first proximal edges 216 is coextensive with the respective end 210 of the blank 200, and is coextensive with a first axis 218, which may be referred to as an axis of bending, or bend axis, as described below. Each respective first and second tab 204A and 204B is configured to extend from the respective coextensive end 210 and first proximate edge 216 to a first distal edge 220 that is opposite to and parallel with the respective first proximal edge 216. Each respective first and second channel tab 204A and 204B is further configured with respective second and third axes 222 and 224. Each of the second and third axes 222 and 224 is parallel to the respective first axis 218 and is located between the respective first proximal edge 216 and the respective first distal edge 220. The second channel tab 204B is configured as a mirror image of the first tab 204A. With each of the tabs 204A and 204B integral with the sheet 203, each of the tabs 204A and 204B is fabricated from the same particular material as is used to make the sheet 203.

Regardless of the configuration of the sides 208 and ends 210 of the sheet 203, FIGS. 7A and 7B also show that the sheet 203 is also configured with the channel tabs 204C and 204D, which for purposes of description are referred to as respective third and fourth channel tabs 204C and 204D. In the detail of FIG. 7B, each of the third and fourth channel tabs 204C and 204D is configured with a second proximal side 226 integral with a different one of the sides 208 along a fourth axis 228, which may also be referred to as an axis of bending, or bend axis, as described below. Each of the third and fourth channel tabs 204C and 204D may be referred to as a "side tab". Each of the third and fourth channel tabs 204C and 204D is configured with a second distal side 230 opposite to and parallel with the respective second proximal side 226. Each of the third and fourth channel tabs 204C and 204D is configured with respective fifth and sixth axes 232 and 234, each of which is parallel to the respective fourth axis 228 and perpendicular to the third axis 224, and is located between the respective second proximal side 226 and the respective second distal side 230.

The distance between the proximal edge 216 and the distal edge 220, and the distance between the proximal side 226 and the distal side 230, will depend on the desired structural characteristics of the plurality of structural channels 206. In a preferred embodiment of the baffle 202, these distances may be three inches, for example. The distance between the distal edge 220 and the third axis 224 may be one-half inch, for example. The distance between the third axis 224 and the second axis 222 may be one inch, for example. The distance between the second axis 222 and the proximal edge 216 may be one and one-half inches, for example. The distance between the distal side 230 and the third axis 234 may be one-half inch, for example. The distance between the third axis 234 and the second axis 232 may be one inch, for example. The distance between the second axis 232 and the proximal side 226 may be one and one-half inches, for example.

Figure 8H:
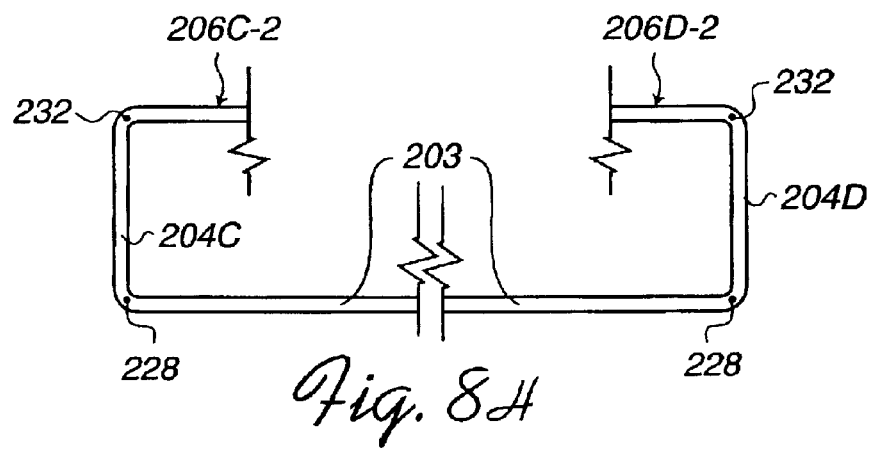

FIGS. 8A through 8I illustrate that by being configured with the above-described thickness, distances and material, for example, the integral sheet 203 and channel tabs 204A through 204D integral with the sheet 203, are configured to be bent, or to bend, along each of the respective first, second, third, fourth, fifth, and sixth axes 218, 222, 224, 228, 232, and 234 to define a plurality of the structural channels 206. Such structural channels are referred to collectively using the reference number 206. An exemplary first one of the structural channels is configured using both of the end tabs 204A and 204B, thus, the structural channel reference number 206AB-1 is used to identify the first structural channel (FIG. 8D). A second structural channel 206 may be configured using one such integral channel tab 204 and the sheet 203. An example is the individual channel tab 204A shown in FIG. 8E, and the sheet 203. The resulting second structural channel is referred to as the channel 206A-2 (FIG. 8E) to identify the second one of such structural channels configured from the "A" channel tab 204A and the sheet 203. The structural channel reference number 206A-3 (FIG. 8F) identifies a third one of such channels configured from the "A" tab 204A and the sheet 203. The reference numbers 206B-2 and 206B-3 refer to corresponding channels configured using the "B" tab 204B.

Another exemplary "first" one of the structural channels may be configured using both of the side tabs 204C and 204D and the sheet 203, thus the structural channel reference number 206CD-1 (FIG. 8G) is used to identify the different first structural channel configured using both of such side tabs 204C and 204D. Another structural channel 206 may be provided in conjunction with one such integral channel tab 204 and the sheet 203. For example, the tab may be the individual side channel tab 204C, and the resulting structural channel is referred to as the channel 206C-2 (FIG. 8H) to identify a second one of such structural channels configured from the "C" channel tab 204C. The structural channel reference number 206C-3 (FIG. 8I) identifies a third one of such structural channels configured from the "C" tab 204C. The reference numbers 206D-2 and 206D-3 refer to corresponding channels configured using the "D" tab 204B.

With the various structural channels 206 in mind, by reference to FIGS. 8B and 8C it may be appreciated that the overall configuration of the sheet 203 and the respective tabs 204A and 204B (FIG. 8C), and the overall configuration of the sheet 203 and the respective tabs 204C and 204D (FIG. 8B), is a convoluted configuration in that the bent tabs 204 are coiled up, with the sheet 203 being flat, and the respective tabs 204 being flat between the respective axes 218, 222, and 224 (FIG. 8C), and the respective tabs 204 being flat between the respective axes 228, 232, and 234 (FIG. 8B).

Also, when FIG. 8B is rotated clockwise ninety degrees it may be appreciated that the overall configurations of the bent respective tabs 204C and 204D are respectfully generally J-shaped and generally reverse J-shaped. Similarly, when FIG. 8C is rotated clockwise one hundred eighty degrees it may be appreciated that the overall configurations of the bent respective tabs 204B and 204A are respectfully generally J-shaped and generally reverse J-shaped.

FIGS. 7A and 7C show that to facilitate such bending, a first embodiment of notches 235 may be provided in the tabs 204. In general, in this embodiment one notch 235 may be provided in one of a side tab (e.g., 204C) or as shown in FIG. 7A, in one of the end tabs that is adjacent to the one side tab (e.g., the end tab 204A). Thus, at each corner 214 of the sheet 203, one notch 235 may be provided in the side tab 204 or in the end tab 204 that is adjacent to the side tab 204. While each of the first and second end channel tabs 204A or 204B may be so provided with the notches 235, as another example of how the notches 235 may be configured, FIGS. 7A and 7C show exemplary opposed notches 235 configured in each of the first and second end channel tabs 204A and 204B. These exemplary notches 235 allow the respective bent third and fourth channel tabs 204C and 204D to cooperate in a desired manner with the other respective bent first and second channel tabs 204A and 204B. The desired cooperation provided by these exemplary notches 235 is to allow the respective first and second channel tabs 204A and 204B to be bent along the respective axis 218, 222, and 224 without interfering with the previously respective bent third and fourth channel tabs 204C or 204D. As another example, when the notches 235 are provided in the side channel tabs 204C and 204D, such notches 235 allow the respective first and second channel tabs 204A and 204B to cooperate with the other respective bent third and fourth channel tabs 204C and 204D in a similar manner. The desired cooperation provided by the notches 235 is to allow the respective first and second channel tabs 204A and 204B to be bent along the respective axis 218, 222, and 224 without interfering with the respective bent third and fourth channel tabs 204C or 204D.

As shown in more detail in FIGS. 9A through 9H, in a preferred embodiment of the present invention the exemplary four tabs 204A, 204B, 204C, and 204D may be configured so that the structural channels 206 configured using corresponding ones of the tabs 204 are of uniform and generally similar size and configuration. In this regard, it may be appreciated that one particular structural channel 206 may be configured from less than all of a particular one of the tabs 204, and that a different particular structural channel 206 may be configured from a portion of a particular one of the tabs 204 and from a portion of the sheet 203, for example. For example, FIGS. 8D, 8E, and 8F collectively depict five structural channels 206 that have been configured from the one sheet 203 and from the two tabs 204A and 204B shown in FIG. 8C. Similarly, FIGS. 8G, 8H, and 8I collectively depict five structural channels 206 that have been configured from the one sheet 203 and the two tabs 204C and 204D shown in FIG. 8B.

Figure 8I:
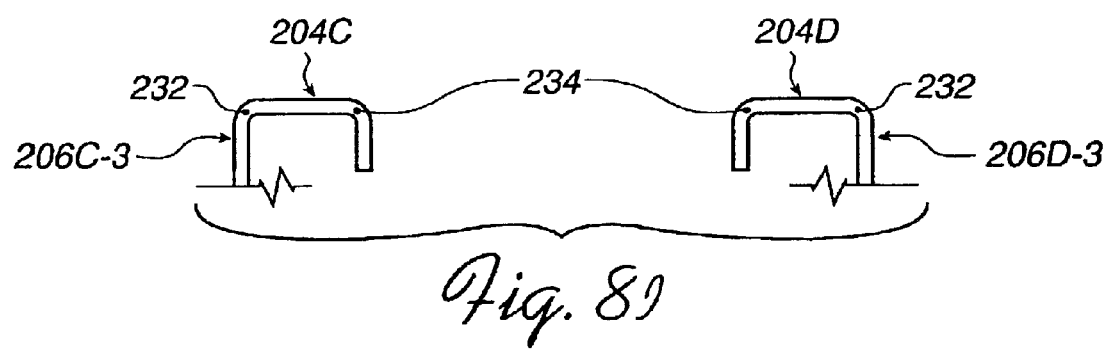

In more detail, the first structural channel 206AB-1 (FIG. 8D) is of generally similar size and configuration as the first structural channel 206CD-1 (FIG. 8G), except for the lengths L1 and L2. Also, the second structural channel 206A-2 (FIG. 8E) is of generally similar size and configuration as each of the second structural channels 206B-2 (FIG. 8E) and 206C-2 and 206D-2 (FIG. 8H). Similarly, the third structural channel 206A-3 (FIG. 8F) is of generally similar size and configuration as each of the third structural channels 206B-3 (FIG. 8F) and 206C-3 and 206D-3 (FIG. 8I).

A method of the present invention may be provided for fabricating the blank 200. The method is shown in conjunction with FIGS. 7A through 7C and with reference to the flow chart 236 shown in FIG. 10A. The method starts with an operation 237 of providing the baffle blank 200 as described above with respect to FIGS. 7A through 7C. The blank 200 is in the form of the sheet 203 having the dimensions L1 and L2 (FIG. 7A) and is fabricated from the selected material. The method moves to operation 238 in which the tabs 204 are provided integral with the sheet 203. The sheet 203 and the tabs 204 may be integral by being cut out, or stamped, from the same piece of the material. The method then moves to an operation 239 in which, for each structural channel tab 204A, 204B, 204C, and 204D, the three bend axes are identified as shown in FIGS. 7B and 7C (e.g., 218, 222, and 224). Lastly, the method moves to operation 240 in which there is an identification of the opposite structural tabs that are to be configured with the notches 235. As described above, for example, in the first notch embodiment one of two adjacent tabs (e.g., one of the tabs 204A and 204C) may be identified to have with a notch 235 at each corner 214. Then the notches 235 are stamped, for example, in the tabs 204.

Figure 9G:
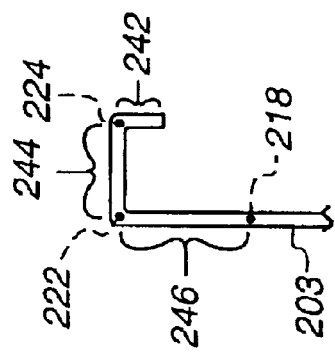
Figure 9H:
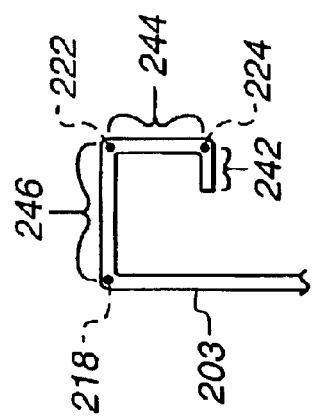
Figure 9E:
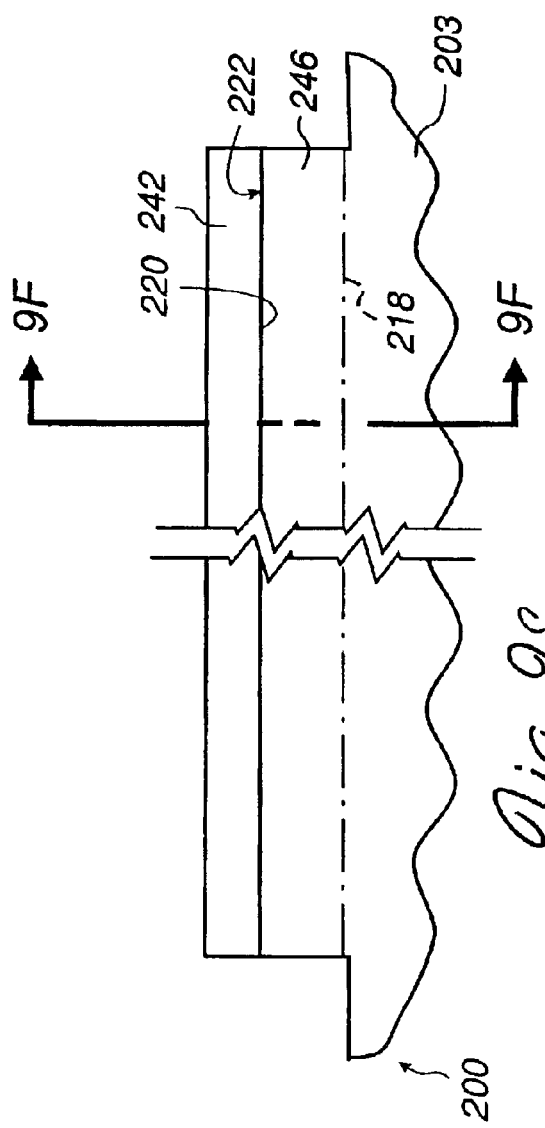
Figure 9G:
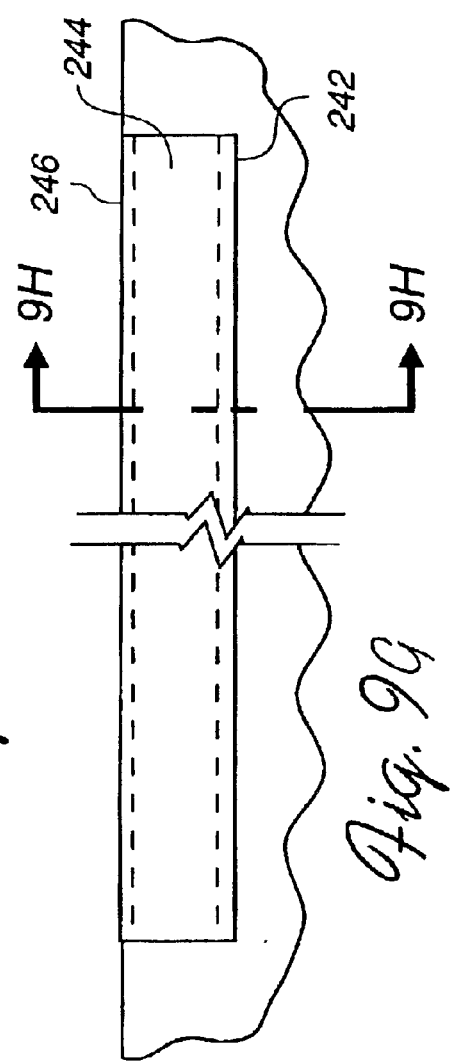

Another method of the present invention may be provided for defining a baffle 202 with structural channels 206. The method is shown in conjunction with FIGS. 9A through 9H, and is described in a flow chart 250 of FIG. 10B. In an operation 252 the sheet 203, and the tabs 204 integral with the sheet 203, are provided as described above. Operation 252 may be performed according to the flow chart 236 shown in FIG. 10A, for example. FIG. 9A shows an exemplary end tab 204A that is an integral part of the sheet 203 of the blank 200 that is described above with respect to FIGS. 7A through 7C. The sheet 203 provided as a part of the blank 200 has an initial configuration that is flat and coplanar with the end tab 204A as shown in FIG. 9B. The exemplary end tab 204A is configured with three sections 242, 244, and 246 that are between the distal edge 220 and the proximal edge 216. A first of the sections 242 extends between the distal edge 220 and the third axis 224. The method moves to an operation 254 in which the end tab 204A, for example, is bent by moving the first section 242 relative to the second section 244, which is by bending along the third axis 224 as shown in FIGS. 9C and 9D. A second section 244 is between the third axis 224 and the second axis 222. The method moves to an operation 256 in which the end tab 204A, for example, is further bent by moving the second section 244 relative to the third section 246, which is by bending along the second axis 222 as shown in FIGS. 9E and 9F. A third section 246 is between the second axis 222 and the first axis 218. The method moves to an operation 258 in which the end tab 204A, for example, is further bent by moving the third section 246 relative to the second section 244, which is by bending along the first axis 218 as shown in FIGS. 9G and 9H. Thus, the exemplary end tab 204A is successively bent according to the present invention as a first part of four tab-bending operations, one bending operation being for each of the tabs 204A through 204D. The method then moves to an operation 260 in which a decision is made as to whether all tabs 204 have been bent. If YES, the method is DONE, else if NO, the method moves to an operation 261 in which there is a selection of the next tab 204 that has not been bent. It may be understood that based on the selection in operation 261, in this example, the bending operations 254, 256, and 258 are repeated with respect to the opposite end tab 204B, for example, which is thereby bent in a similar manner to define the baffle configuration shown in FIG. 8C. Further, it may be understood that based on the next selection in operation 261, in this example, the operations 254, 256, and 258 are repeated with respect to the side tab 204C, which is thereby bent in a similar manner to define the baffle configuration shown at the top of FIG. 8B. Lastly, it may be understood that based on the operation 261, in this example, the operations 254, 256, and 258 are repeated with respect to the opposite side tab 204D, which is thereby bent in a similar manner to complete the definition of the baffle configuration as shown in FIG. 8B. Because in this example, the side tab 204D is the last tab to be bent, operation 260 is answered YES, and the fabrication of the baffle 202 is DONE.

Figure 1A:
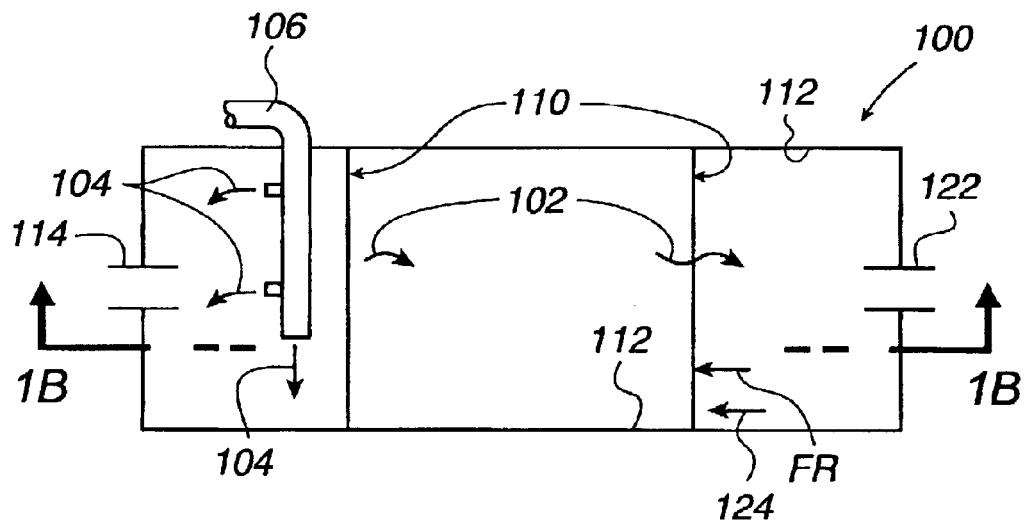
FIGS. 1A, 1B, 2A, 2B, 3A, 3B, 4A, 4B, 5A, 5B and 6 depict typical prior containers in which processes for treating liquid may occur, wherein prior flow controllers assist in performance of the processes, but the prior flow controllers generally require relatively frequent maintenance.
Figure 1B:
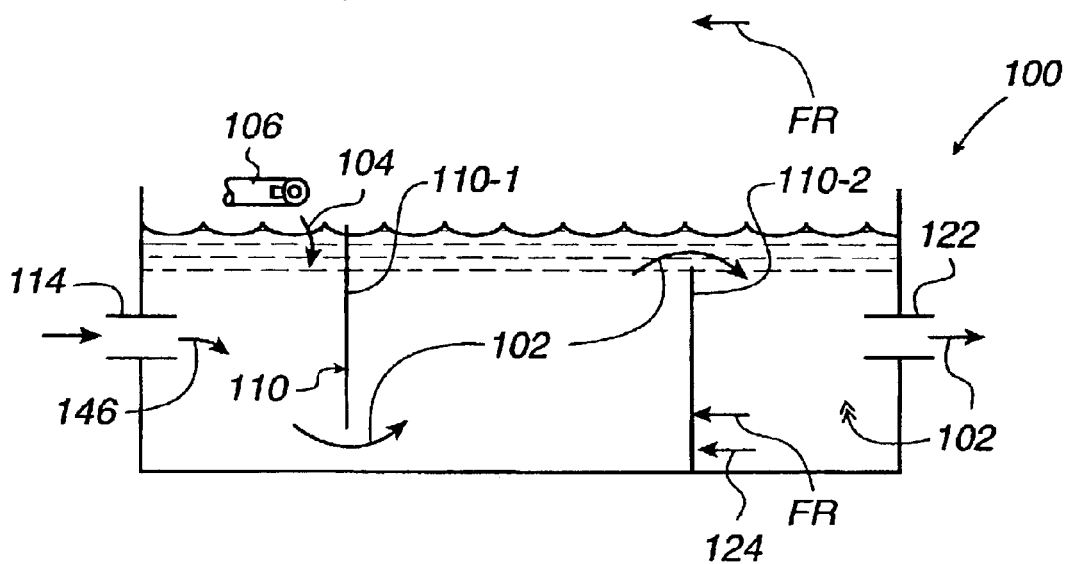
Figure 2A:
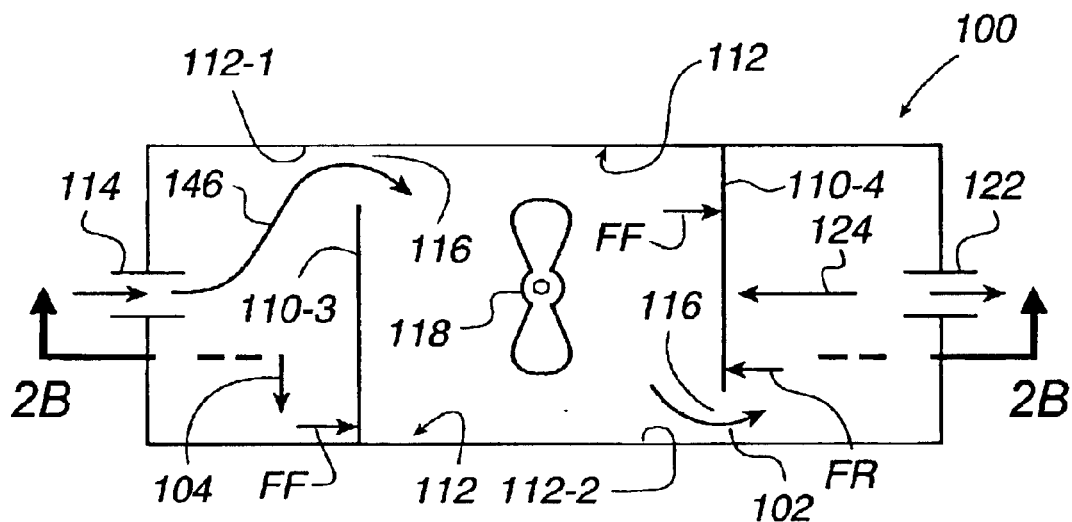
Figure 2B:
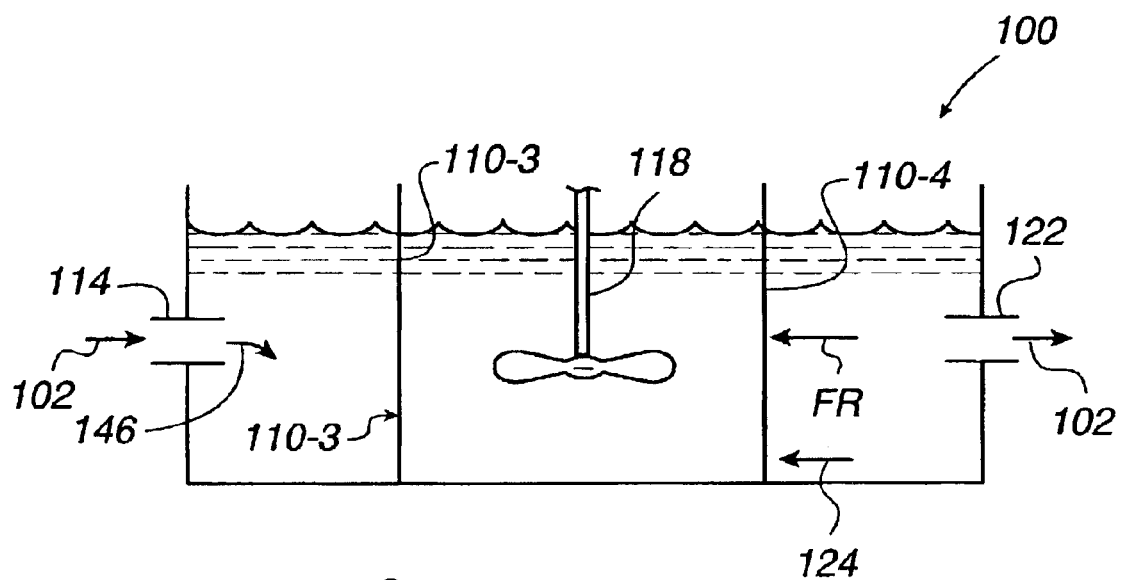
Figure 11A:
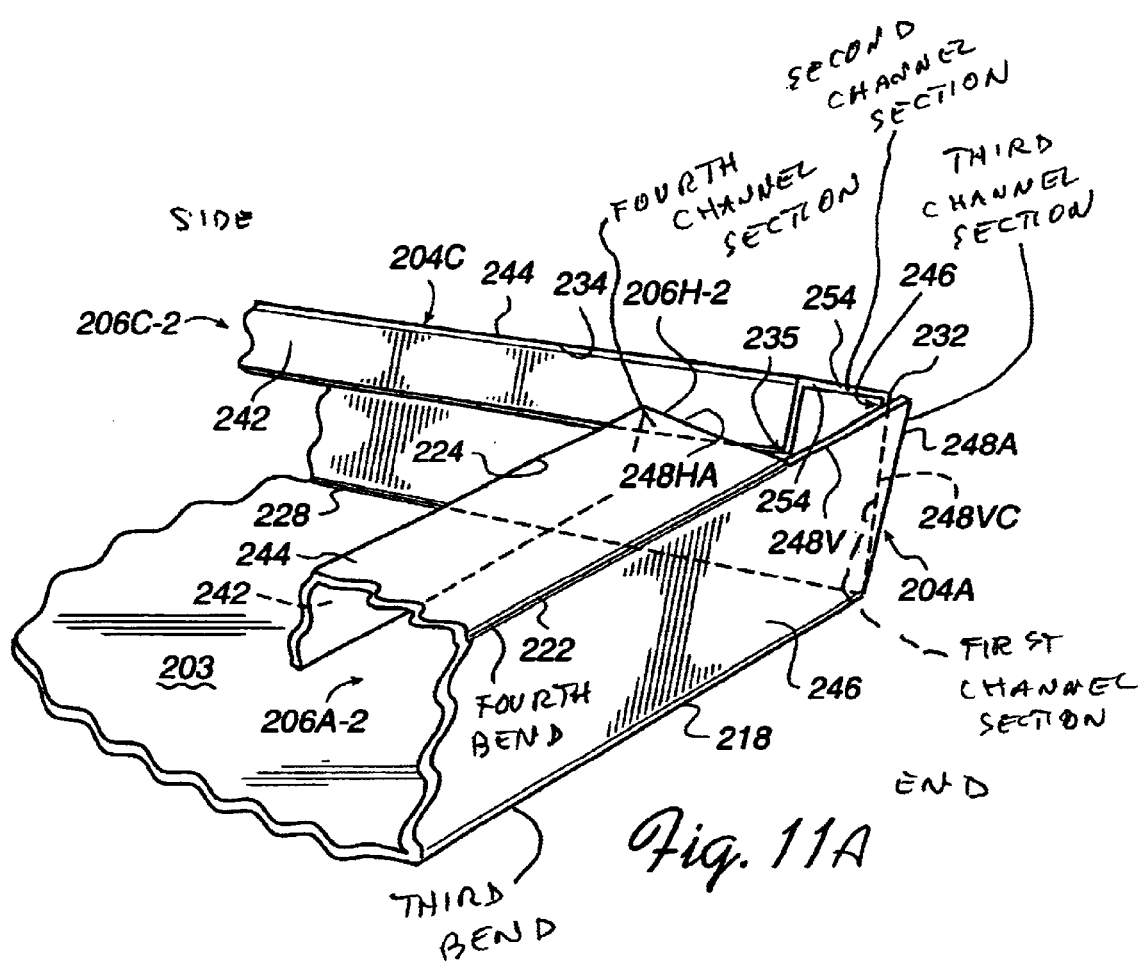
FIG. 11A is a perspective view of one corner of the baffle, which is oriented as installed in a basin, illustrating a notch cut out of one of the end tabs to provide clearances which allow the end tabs to be fully bent after bending of the side tabs.
Figure 11B:
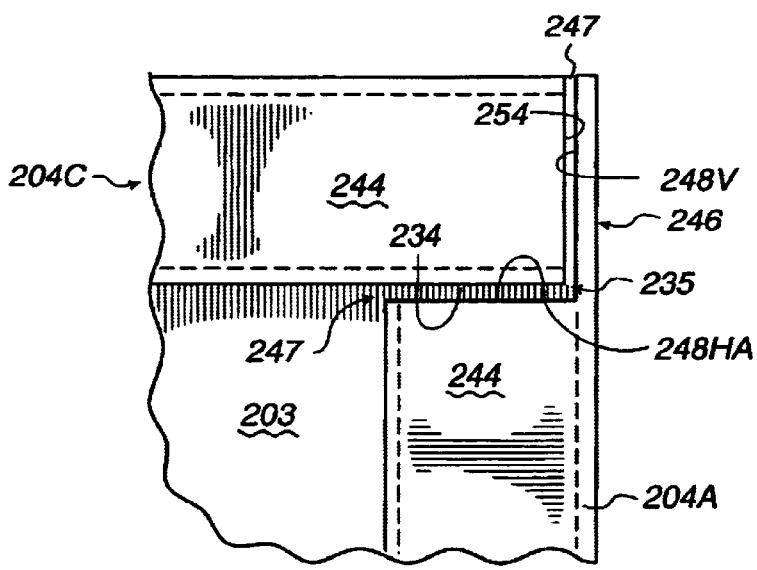
FIG. 11B is an elevational view taken along line 11B—11B in FIG. 11A, illustrating one of the notches.

Referring again to FIGS. 7A and 7C, and to FIGS. 11A and 11B, reference is made to the first embodiment of the notches 235. In the exemplary end tab 204A and side tab 204C shown in FIGS. 11A and 11B, the notches 235 are configured in the end tabs 204A, and one notch 235 is shown providing a clearance 247 detailed in FIG. 11B. The clearances 247 allow the exemplary end tabs 204A and 204B to be bent into the structural channel configuration shown in FIG. 8C after the side tab 204C and the side tab 204D have been bent into the structural channel configurations shown in FIG. 8B. FIG. 8A shows the side tab 204C extending horizontally (e.g., across a basin 100, FIG. 1A, for example). The side tab 204C extends completely between the two axes 218 of the ends 210.

FIG. 11A shows on side of the side tab 204C extending to that axis 218. As shown in FIG. 11A, the side tab has been bent along the axis 228 so that the section 246 extends horizontally. The side tab 204C has also been bent along the axis 232 so that the section 244 extends vertically from the axis 232. The side tab 204C has also been bent along the axis 234 so that the section 242 extends horizontally from the axis 234. Because the side tab 204C has in this example been completely bent first (i.e., before the bending of the end tab 204A), the side tab 204C has thus assumed the fully-bent configuration shown in FIG. 8B before the start of the bending of the end tab 204A.

It is recalled that the operations 254 and 256 described in flow chart 250 (FIG. 10B) first bend the first and second sections 242 and 244 of the first end tabs 204A and 204B before bending the third sections 246 of the end tabs 204A and 204B. In contrast, in the example of FIGS. 11A and 11B, the side tabs 204C and 204D are described as having been bent before the bending of the end tabs 204A and 204B. Without any notch 235 in the side tabs 204C or 204D, but with the notches 235 in the end tabs 204A and 204B, in operation 258 the last sections 246 of the end tabs 204A and 204B may be bent along the axes 218 into the vertical position shown in FIGS. 11A and 11B without interfering with the previously-bent side tabs 204C and 204D.

It may be understood that in the example of FIGS. 10A and 10B, when operations 254 and 256 are performed with respect to side tabs 204C and 204D, the first and second sections 242 and 244 may be bent as shown in FIGS. 8H and 8I without interfering with the previously bent end tabs 204A and 204B. The notches 235 are provided as described above so that in this example the sections 246 of the side tabs 204C and 204D may be so bent along the axis 228. Such bending of the side tabs 204C and 204D is similar to that shown in FIGS. 11A and 11B with respect to the end tab 204A.

Considering FIG. 11A, the baffle 202 is described as installed, with the sheet 203 oriented vertically and the channel 206C-2 horizontally and the channel 206A-2 vertically, for example. A horizontal edge 248VC (see dashed lines) of the section 246 of the side tab 204C may engage a horizontal edge 248A of the section 246 of the end tab 204A. Because of the notch 235, the respective first and second sections 242 and 244 of the end tab 204A are shown having been cut away so that a vertical edge 248V of the end tab 204A may engage, or may almost engage, a vertical edge 254 of the side tab 204C, just as the last section 246 of the end tab 204A is fully bent into the vertical position. As shown in FIGS. 11A and 11B, as the edge 248V of the end tab 204A moves leftward and approaches the edge 254 of the side tab 204C, the notch 235 is necessary to allow an edge 248HA of the section 244 of the end tab 204A to clear (i.e., pass without interference with) the axis 234 that defines the first bend of the side tab 204C. At the time the edge 248HA and the axis 234 come together, or almost together as defined by the clearance 247 in FIG. 11B, the edge 248HA will be in an overlapping relationship with the axis 234 of the side tab 204C. Because the opposite end of the end tab 204A is also provided with one of the notches 235, the opposite end of the end tab 204A will also clear the previously bent side tab 204D in the same manner.

Referring again to FIG. 8A, there is shown the combination of the various tabs 204 having been bent into the configuration characterized by the plurality of structural channels 206 along each of opposite sides 208 and each of opposite ends 210 of the sheet 203. The combination of these bent tabs 204 is shown forming a frame 249 around the perimeter of the sheet 203. A section 249C of the frame 249 extends along one of the sides 208, and a section 249D of the frame 249 extends along the opposite one of the sides 208. A section 249A of the frame 249 extends along one of the ends 210, and a section 249B of the frame 249 extends along the opposite one of the ends 210. The frame 249 is configured with a flat surface 249S that is continuous except at the clearances 247. The flat surface 249S corresponds to the bent sections 244 shown in FIGS. 11A and 11B. It may be appreciated then, that the configuration of the frame 249 in extending completely around the perimeter of the sheet 203 provides support for the sheet 203 with respect to the forward and reverse forces F, respectively shown as FF and FR, for example, and such support extends along each of the sides 208 and each of the ends 210.

When the baffle 202 is received in the channels or brackets 162 in place of the boards 160, the brackets 162 hold the baffle 202 in place in the basin 100 along the second channels 206A and 206B shown in FIG. 8C. However, as described below, the baffle 202 so held by the brackets 162 is subject to certain forces. For example, referring to FIG. 12A, the first structural channel 206CD-1 is shown being subjected to the force of gravity FG. The structural configuration of the first structural channel 206CD-1 resists the force of gravity FG. Also, referring to FIG. 12B, the second structural channel 206C-2 and the second structural channel 206D-2 are shown having forces FP applied by the liquid 102 to perimeter portions that are away from the center of the sheet 203. Similarly, referring to FIG. 12D, the second structural channel 206A-2 and the second structural channel 206B-2, which are shown in plan view as installed in the brackets 162, are also shown with the forces FP applied by the liquid 102 to perimeter portions that are away from the center of the sheet 203. The forces FP may be horizontal, and in either forward or reverse directions, as applied by the liquid 102 to the baffle 202. The structural configurations of the second structural channels 206A-2, 206B-2, 206C-2, and 206D-2 resist the forces FP.

Figure 12D:
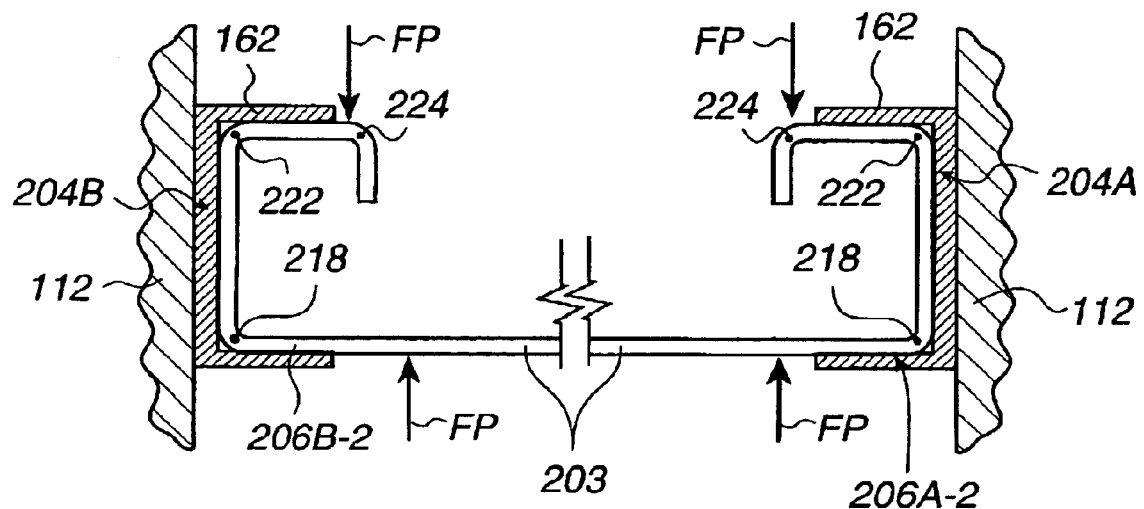
FIG. 12D is a cross sectional view of the end tabs of the baffle showing forces applied by the liquid to perimeter portions of the baffle.
Figure 12E:
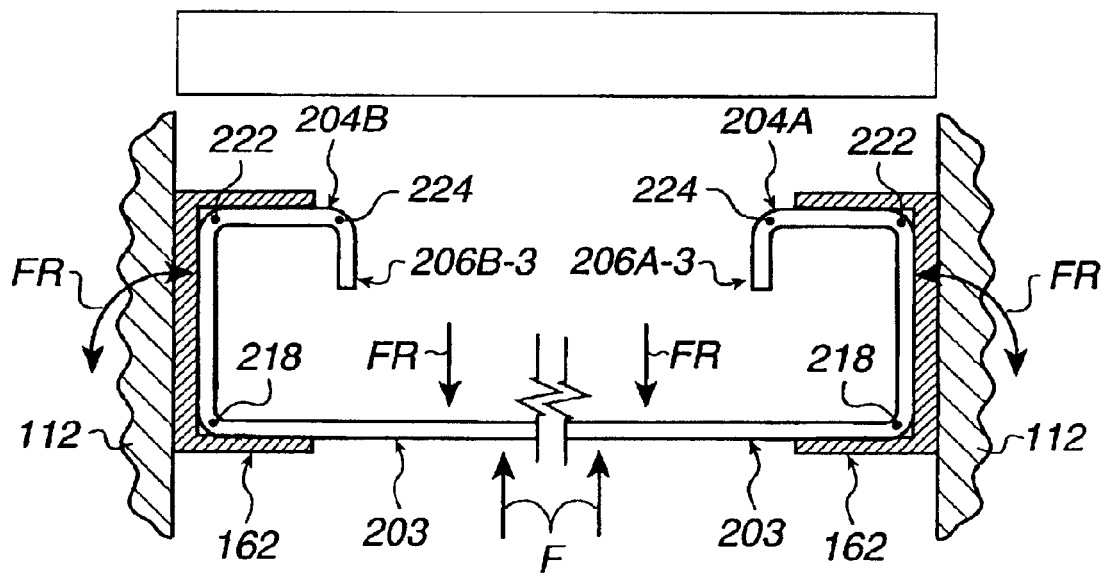
FIG. 12E is a cross sectional view of the baffle of FIG. 12D showing structural channels subject to reaction forces.

Referring to FIG. 12E, the third structural channels 206A-3 and 206B-3 are shown being subject to reaction forces FR (see curved arrow FR). The third structural channels 206A-3 and 206B-3 receive the forces FR from the sheet 203 which is receiving forces F (see straight arrow F) or reverse forces FR (see reverse straight arrow FR) from the flow of the liquid 102. A forward flow F (upward in FIG. 12E) causes the sheet 203 to transmit the forward forces F through the first structural channel 206AB-1 (FIG. 8D) and through the respective second structural channels 206A-2 and 206B-2 (FIG. 12D) in an outward direction to the right shown by curved arrow FR (downward in FIG. 12E) to the third structural channel 206A-3 and in an outward direction to the left shown by curved arrow FR (downward in FIG. 12E) to the third structural channel 206B-3. A reverse flow FR shown by straight arrow FR (downward in FIG. 12E) causes the sheet 203 to transmit the reverse forces FR through the first structural channel 206AB-1 (FIG. 8D) and through the respective second structural channels 206A-2 and 206B-2 (FIG. 12D). The transmitted force is shown by curved arrow FR to the left in FIG. 12E to the third structural channel 206A-3 and is shown by the curved arrow FR to the right to the third structural channel 206B-3.

Similarly, as shown by the elevational view of in FIG. 12C, the third structural channels 206C-3 and 206D-3 are subject to the reaction forces FR (see curved arrows FR). The third structural channels 206C-3 and 206D-3 also receive the reverse forces FR (see curved arrows FR) from the sheet 203 which is receiving forward forces F from the flow of the liquid 102. The sheet 203 transmits the forward forces F (to the right in FIG. 12C) through the first structural channel 206CD-1 (FIG. 12A) and through the respective second structural channels 206C-2 and 206D-2 (FIG. 12B) as respective outward forces FR (see upwardly curved arrow FR) around axis 228 to the third structural channel 206C-3. The forward force F is also applied to the third structural channel 206D-3 as an outward force FR (see downwardly curved arrow FR). The configurations of the respective third structural channels 206A-3, 206B-3, 206C-3, and 206D-3 resist the forces FR from the liquid 102.

Figure 13:
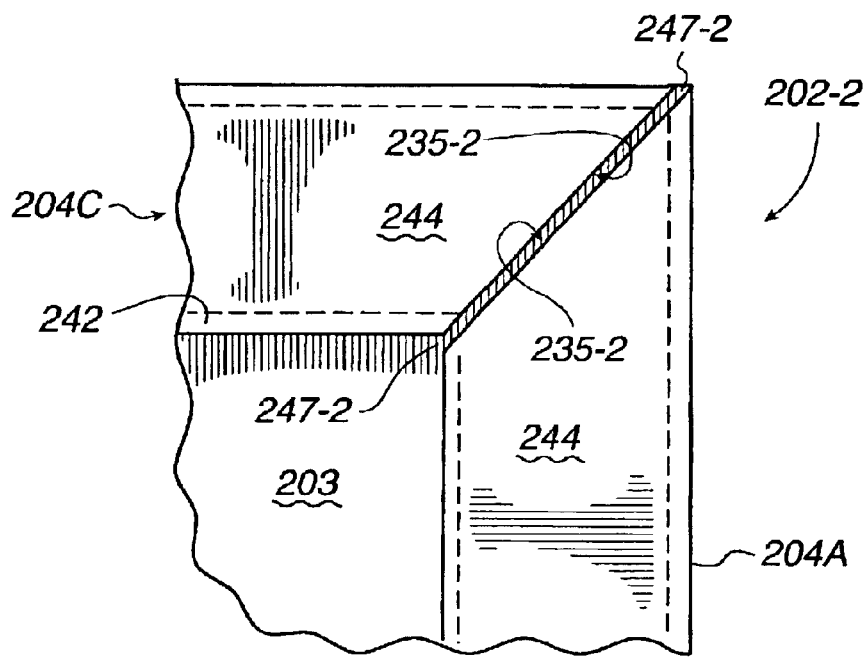
FIG. 13 is an elevational view of a second embodiment of the baffle of the present invention in position to be installed in a basin, showing mitered notches formed in each of adjacent channel structures of the end and side tabs.

Another embodiment of the baffle 202-2 is shown in FIG. 13 including a second embodiment of the notches, which are referred to as notches 235-2. FIG. 13 shows the notches 235-2 configured in each of an adjacent exemplary end tab 204A and side tab 204C. The notches 253-2 are each mitered, that is, cut at a diagonal angle in each of the sections 244 of the respective end tab 204A and side tab 204C, and then are cut downwardly in the respective sections 242 of each such tab 204A and 204C. Similar notches 235-2 are provided in each adjacent end tab 204A and side tab 204D, and each adjacent end tab 204B and each adjacent side tab 204D, and end tab 204B and side tab 204C. The notches 235-2 are shown in elevational view in FIG. 13 in a manner similar to how FIG. 11B shows the notches 235, and are exemplary of those other notches 235-2. A clearance 247-2 is shown in detail in FIG. 13. With the side tab 204C having been first bent into the shape of the channel 206C (see FIG. 8B, for example), the clearance 247-2 extends between the end tab 204A and the side tab 204C to allow the exemplary end tab 204A to be bent into the structural channel configuration shown in FIG. 8C after such bending of the side tab 204C.

Figure 14:
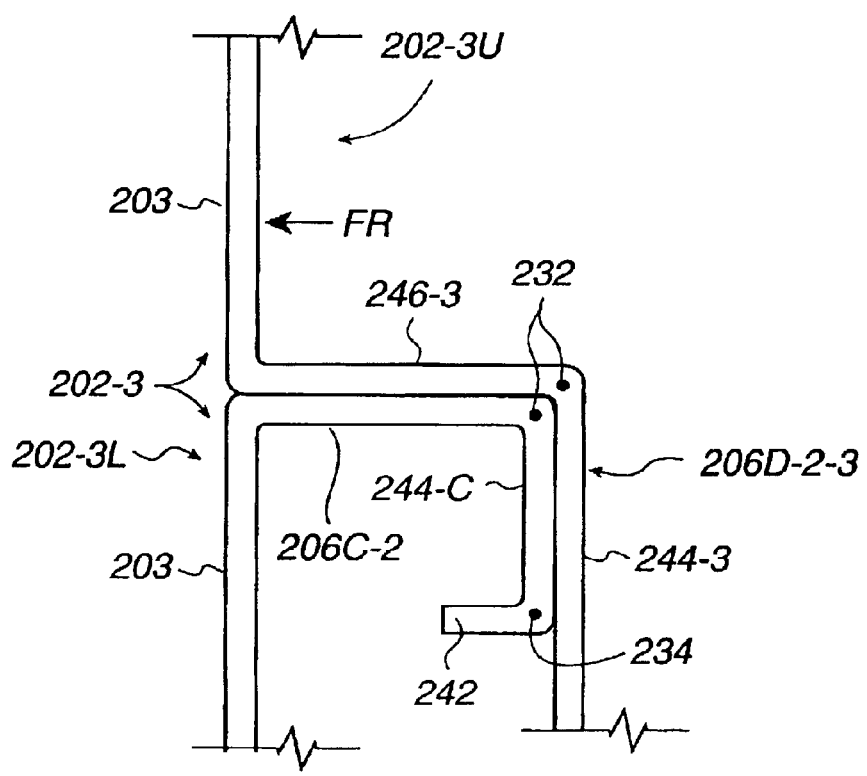
FIG. 14 is a side elevational view of two baffles of a third embodiment the baffles of the present invention, one baffle being above the other and having a differently bent channel section.

FIG. 14 shows another embodiment 202-3 of the baffles 202, which facilitates another type of cooperation of two or more of the baffles 202-3 (shown as 202-3U and 202-3L) when placed one above the other. FIG. 14 shows an elevational side view of the baffles similar to FIG. 8B, but with the two baffles 202-3U and 202-3L shown placed one above the other. The lower baffle 202-3L has the same channel configurations 206C-2 and 206C-3 as is shown in respective FIGS. 12B and 12C. However, the bottom side tab 204D of the upper baffle 202-3U is shown having the section 244 (identified as the section 244-3) of a channel 206D-2-3 bent oppositely to that shown in FIG. 12C so that the section 244-3 extends downwardly and overlaps the section 244-C of the channel 206C-2 of the lower baffle 202-3L. Also, the location of the bend axis 232 of the upper baffle 202-3U may be spaced from the sheet 203 suitably to facilitate such overlapping. The section 244-3 may extend straight, past the respective bend axis 234 of the lower baffle 202-3L, for example. It is observed that the channel section 244-3 is offset from the respective sheet 203 in the vertical direction shown in FIG. 14 to define a channel space bounded by the section 246-3 and the section 244-3. The lower baffle 202-3L is received in the channel space. It is also observed that the channel section 244-3 is offset from the sheet 203 in the horizontal direction. Because of the overlapping of the section 244-3 and the section 244-C, the upper baffle 202-3U withstands a right to left force FR (FIG. 14) from the liquid 102. In more detail, the upper channel 206C-2 of the lower baffle 202-3L assists in resisting such force FR, and the section 244-C supports the section 244-3 against such force FR. Such right to left force FR may be the primary, or forward, force that is applied by the liquid 102 against the baffles 202-3 most of the time in the operation of the settler 130, for example, such that most of the time during such operation, the channel 206D2-3 of the upper baffle 202-3U is held aligned by the lower baffle 202-3L as the respective upper and lower baffles 202-3U and 202-3L extend across the width of the basin 100 or across a section 110S of the basin 100.

In review, with the configurations of the structural channels 206 in mind, it may now be understood that the present invention fills the above-described needs by providing the baffle 202 having no shape-holding facilities other than bends at each of the respective first, second, third, fourth, fifth, and sixth axes 218, 222, 224, 228, 232, and 234 to define the plurality of structural channels 206. The baffle 202 may thus control the flow of the liquid 102 in any of the above-described liquid treatment equipment, e.g., for the contact-type or the physical-type of processes. It may also be understood that the present invention also fills these needs through the method of flow chart 236 of providing the unbent blank 200 for making such baffle 202, and through the method of flow chart 250 by bending such unbent blank 200 to provide such baffle 202. In particular, the preferably stainless steel unbent baffle blank 200 may be deformed by the described bending into the configuration that defines a plurality of the structural channels 206. As described above, the deformed blank 200 need not be held bent in such configuration by any fastener or welding, for example. Rather, the plurality of structural channels 206 render the baffle 202 able to withstand the various respective forces F, FP, and FR, for example, applied to the baffle 202 by the incoming liquid 102 and by liquid 102 having a reverse flow direction in the basin 100. Without use of such welding or such fasteners, the baffle 202 remains in the desired bent configuration of the structural channels 206 notwithstanding such forces applied to the baffle 202 during the flow control operation of the baffle 202. The description of such bent baffle 202 (that is not welded or fastened or otherwise secured in the desired configuration) as a "solely-bent" baffle 202 thus indicates the structural characteristic of only being bent into the configuration implementing the desired plurality of structural channels 206, and the structural characteristic of staying in such bent configuration without being retained in such configuration by welds or by fasteners or by any other structure added to the bent material from which the blank 200 is made.

As a result, the solely-bent baffle 202 does not have any of the above-noted corrosion sites that are typically found adjacent to locations at which welds are made. Also, the solely-bent baffle 202 does not have any holes to allow a fastener to extend through the baffle 202, such that there is no weakening of the solely-bent baffle 202 by such holes and no tendency of normal operational vibrations to cause a fastener to become loose. The absence of such welds and holes and fasteners increases the potential period of time during which the soley-bent baffle 202 may remain in service without maintenance (e.g., removal and replacement). Additionally, because the solely-bent baffle 202 does not absorb the liquid 102 and thus does remain in an original relatively light-weight condition (as compared to concrete or liquid-saturated redwood), any required maintenance may be easier and safer to perform using maintenance staff rather than costly hoists or other lifting equipment.

Although the foregoing invention has been described in some detail for purposes of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A soley-bent baffle for controlling flow of a liquid in a flow path, the flow path defining a flow perimeter, the baffle comprising:
   a planar flow control sheet for blocking substantially all of the liquid in the flow path, the sheet having an edge corresponding to the flow perimeter, the edge being configured with at least three linear sides; and
   a channel defined by a series of bends and configured integral with at least a respective one of the sides of the sheet, each channel being configured with a first of the bends co-extensive and integral with the at least respective one of the sides and defining a first channel section, each channel being configured with a second bend defining a second channel section of the channel that extends integral with the first channel section, each channel being configured with a third bend defining a third channel section of the channel that is integral with the second channel section.

2. A soley-bent baffle as recited in claim 1, wherein:
   each of the channels has an end corresponding to a terminus of one of the sides and adjacent ones of the channels have adjacent ends, at least one of the adjacent ends of the adjacent channels is configured with a notch to permit each of the adjacent channels to be configured in the channel configurations without interference between the adjacent channels.

3. A soley-bent baffle as recited in claim 1, wherein:
   each of the channels is defined by a generally convoluted configuration.

4. A soley-bent baffle as recited in claim 1, wherein:
   each of the planar flow control sheet and the channels is fabricated from stainless steel.

5. A baffle as recited in claim 1, wherein:
   the first channel extends perpendicular to the sheet;
   the second channel section extends parallel to the sheet; and
   the third channel section extends perpendicular to the sheet.

6. A soley-bent baffle for controlling flow of a liquid in a flow direction of a flow path in a basin, the baffle comprising:
   a flow control web configured in a single plane to block substantially all of the liquid in at least a portion of the flow path, the flow control web having opposite ends and opposite sides, the ends and the sides being orthogonally oriented with respect to each other,
   a first generally forward-J-shaped channel integral with one of the sides;
   a second generally reverse-J-shaped channel integral with the other of the sides;
   a third generally forward-J-shaped channel integral with one of the ends; and
   a fourth generally reverse-J-shaped channel integral with the other of the ends;
   the generally J-shaped channels extending from the flow control web in a common direction.

7. A soley-bent baffle as recited in claim 6, wherein:
   each of the generally J-shaped channels comprises first and second members oriented parallel to each other and a third member perpendicular to and between the first and second parallel members, each of the members being straight and intersecting another one of the members at a right angle.

8. A soley-bent baffle as recited in claim 7, wherein:
   the opposite sides and the opposite ends include four pairs of adjacent sides and ends, each pair is configured to define a corner of the flow control web; and
   at least one of each generally J-shaped channel that is integral with a respective adjacent side or end that define one of the corners is configured with a notch and the other J-shaped channel that is integral with the other respective adjacent side and end extends into the notch.

9. A soley-bent baffle as recited in claim 8, wherein:
   each of the at least one of each generally J-shaped channel that is integral with a respective adjacent side and each of the at least one of each generally J-shaped channel that is integral with a respective adjacent end that define one of the corners is configured with a notch, and a portion of each notched generally J-shaped channel that is integral with the other respective adjacent side and end extends into the notch of the other J-shaped channel.

10. A soley-bent baffle as recited in claim 8, wherein:
    a channel corner is defined by the at least one generally J-shaped channel that is integral with the respective one of each adjacent side or end of one of the corners and that is configured with the notch, and by the other of the generally J-shaped channels that is integral with the other respective adjacent side or end that extends into the notch; and
    the respective generally J-shaped channels extend between each of the channel corners.

11. A soley-bent baffle as recited in claim 6, wherein:
    each of the planar flow control sheet and the channels is fabricated from stainless steel.

12. A soley-bent baffle for controlling flow of a liquid in a flow direction of a flow path in a basin, the flow path defining a flow perimeter, the baffle comprising:
    a planar flow control sheet for blocking substantially all of the liquid in the flow path, the sheet having a continuous edge corresponding to the flow perimeter, the continuous edge being configured with at least two linear opposite sides and at least two linear opposite ends;
    a generally J-shaped channel soley-defined by channel sections and a series of bends integral with the channel sections, one of the generally J-shaped channels being integral with a separate respective one of the linear opposite sides, at least one of the J-shaped channels being integral with a separate respective one of the linear ends, a first one of the bends being co-extensive and integral with the respective one of the sides or ends and being integral with a first of the channel sections, a second of the bends being integral with the first channel section and with a second of the channel sections, and a third of the bends being integral with the second channel section and with a third of the channel sections.

13. A baffle as recited in claim 12, wherein:

the planar sheet and the first channel sections that are integral with respective ones of the opposite linear sides or the opposite linear ends define a first channel configuration;

a portion of the planar sheet, and a portion of a respective one of the first channel sections integral with a respective one of the opposite linear sides or opposite linear ends, and a respective one of the second channel sections cooperate to define a second channel configuration; and at least a portion of a respective one of the first channel sections that is integral with a respective one of the opposite linear sides or opposite linear ends, and a portion of a respective one of the second channel sections, and a respective one of the third channel sections cooperate to define a third channel configuration.

14. A soley-bent baffle as recited in claim 12, wherein:

each generally J-shaped channel that is integral with a separate respective one of the opposite linear ends cooperates with each generally J-shaped channel that is integral with a separate respective one of the opposite linear sides to define a channel corner; and at least one of the generally J-shaped channels that is integral with a separate respective one of the opposite linear ends and at least one of the generally J-shaped channels that is integral with a separate respective one of the opposite linear sides, that together define one of the channel corners, is configured with a notch to receive the third channel configuration of a respective other of the generally J-shaped channels.

15. A soley-bent baffle as recited in claim 12, wherein:

each generally J-shaped channel that is integral with a separate respective one of the linear ends cooperates with each generally J-shaped channel that is integral with a separate respective one of the linear sides to define a channel corner; and each generally J-shaped channel is configured with a notch to receive the third channel configuration of the other of the generally J-shaped channels that defines the corner.

16. A soley-bent baffle as recited in claim 12, wherein:

each of the planar flow control sheet and the generally J-shaped channels and the bends is fabricated from stainless steel.

17. A soley-bent baffle as recited in claim 12, wherein:

each of the two linear sides is between about three feet long and about ten feet long and each of the two linear ends is between about three inches long to about three feet long;

each of the planar flow control sheet and the generally J-shaped channels and the bends is fabricated from stainless steel; and the planar sheet and the first channel sections that are integral with respective ones of the opposite linear sides and that define the first channel configuration resist the force of gravity that tends to cause the baffle to sag between the at least two linear ends.

18. A soley-bent baffle as recited in claim 12, wherein the baffle is configured to resist a force in the flow direction, wherein the force is applied by the liquid to the baffle around the perimeter, and wherein:

each of the two linear sides is between about three feet long and about ten feet long and each of the two linear ends is between about three inches long and about three feet long;

each of the planar flow control sheet and the generally J-shaped channels and the bends is fabricated from stainless steel; and the force is resisted by the second channel configurations that are integral with the respective sides and ends of the sheet.

19. A soley-bent baffle as recited in claim 12, wherein the baffle is configured to resist a force in the flow direction, wherein the force is applied by the liquid to the planar flow control sheet within the perimeter, and wherein:

each of the planar flow control sheet and the generally J-shaped channels and the bends is fabricated from stainless steel; and the force is resisted by the third channel configurations that are integral with the respective ends and sides of the sheet.

20. A baffle for controlling flow of a liquid in a flow path in a basin, the flow path defining a flow perimeter, the baffle comprising:

a planar sheet having a continuous edge corresponding to the flow perimeter, the continuous edge being configured with at least two linear sides and at least two linear ends;

a plurality of channels, each of the channels being soley-defined by channel sections and a series of bends integral with the channel sections, one of the channels being integral with a separate respective one of the linear sides, one of the channels being integral with a separate respective one of the linear ends, one of the bends being co-extensive and integral with the respective one of the sides or ends and being integral with a first of the channel sections, a second of the bends being integral with the first channel section and with a second of the channel sections, and a third of the bends being integral with the second channel section and with a third of the channel sections;

a first channel configuration defined by the planar sheet and the first channel sections that are integral with respective ones of the opposite linear sides or ends;

a second channel configuration defined by a portion of the planar sheet, and a respective one of the first channel sections integral with a respective one of the opposite linear sides or ends, and a respective one of the second channel sections;

a third channel configuration defined by at least a portion of a respective one of the first channel sections that is integral with a respective one of the opposite linear sides or ends, and a respective one of the second channel sections, and a respective one of the third channel sections;

a channel corner defined by each channel that is integral with a separate respective one of the linear ends and each channel that is integral with a separate respective one of the linear sides; and one of the channels that defines one of the channel corners being configured with a notch to receive the third channel configuration of the other of the channels that defines the one of the channel corners.

21. A baffle as recited in claim 20, wherein:

each of the planar sheet and the channels and the bends is fabricated from stainless steel.

22. A baffle as recited in claim 20, wherein:

each of the channels that defines one of the corners is configured with one of the notches, and wherein:

the notches are mitered so that the second and third channel configurations of the respective notched channels define one of the channel corners and are configured to receive the respective second and third channel configuration of the respective other of the notched channels.

23. A soley-bent baffle for controlling flow of a liquid in a flow path, the flow path defining a flow perimeter, the baffle comprising:

a planar flow control sheet for blocking substantially all of the liquid in the flow path, the sheet having a continuous edge corresponding to the flow perimeter, the edge being configured with at least three linear sides; and a channel defined by a series of bends and configured integral with each respective one of the sides of the sheet, a first group of the channels being configured integral with at least two of the sides, each channel of the first group of channels being configured with a first of the bends co-extensive and integral with the respective one of the sides and defining a first channel section extending perpendicular to the sheet, each channel of the first group of channels being configured with a second bend defining a second channel section of the channel that extends parallel to the sheet and integral with the first channel section, each channel of the first group of channels being configured with a third bend defining a third channel section of the channel that is perpendicular to the sheet and integral with the second channel section, a second channel configured integral with one of the sides, the second channel being configured with a fourth of the bends co-extensive and integral with the respective one of the sides and defining a fourth channel section extending perpendicular to the sheet, the second channel being configured with a fifth bend defining a fifth channel section of the second channel that extends parallel to the sheet and integral with the fourth channel section.

24. A baffle as recited in claim 23, wherein:

the fifth bend is configured to position the fifth channel section offset from the sheet so that the parallel sheet and the fifth channel section are separated by a channel space.

25. A baffle as recited in claim 24, wherein a plurality of the soley-bent baffles is configured to be positioned with an upper baffle of the plurality of baffles above a lower of the plurality of the baffles, and wherein:

a respective channel of the first group of channels of the lower baffle is configured to be adjacent to the second channel of the upper baffle, the second channel of the upper baffle being configured to extend in overlapping relationship with respect to the second channel section.

26. A baffle as recited in claim 24, wherein a plurality of the soley-bent baffles is configured to be positioned with an upper baffle of the plurality of baffles above a lower of the plurality of the baffles, and wherein:

the second channel of the upper baffle is configured to define the channel space and a respective channel of the first group of channels of the lower baffle is configured to be received in the channel space and extend along a portion of the second channel of the upper baffle.

27. A soley-bent baffle for controlling flow of a liquid in a flow path, the flow path defining a flow perimeter, the baffle comprising:

a planar flow control sheet for blocking substantially all of the liquid in the flow path, the sheet having an edge corresponding to the flow perimeter, the edge being configured with at least two sides; and a first three channel structure defined by a first series of bends and configured integral with at least two of the sides of the sheet;

the first three channel structure being configured with a first of the bends co-extensive and integral with a first one of the sides to form a first channel section and being configured with a second of the bends co-extensive and integral with a second one of the sides to form a second channel section, the sheet and the first and second channel sections defining a first channel of the first three channel structure;

the first three channel structure being further configured with a third of the bends integral with the first channel section to define a third channel section, a portion of the sheet and the first bend and the first channel section and the third bend and the third channel section defining a second channel of the first three channel structure;

the first three channel structure being further configured with a fourth of the bends integral with the second channel section to define a fourth channel section, a portion of the sheet and the second bend and the second channel section and the fourth bend and the fourth channel section defining a third channel of the first three channel structure.

28. A soley-bent baffle as recited in claim 27, wherein:

the edge is configured with at least two ends; and a second three channel structure is defined by a second series of bends and is configured integral with the two ends of the sheet.

29. A soley-bent baffle as recited in claim 28, wherein:

the second three channel structure is configured with a fifth of the bends co-extensive and integral with a first one of the ends to form a fifth channel section and is configured with a sixth of the bends co-extensive and integral with a second one of the ends to form a sixth channel section, the sheet and the fifth and sixth channel sections defining a first channel of the second three channel structure;

the second three channel structure being further configured with a seventh of the bends integral with the fifth channel section to define a seventh channel section, a portion of the sheet and the fifth bend and the fifth channel section and the seventh bend and the seventh channel section defining a second channel of the second three channel structure;

the second three channel structure being further configured with an eighth of the bends integral with the sixth channel section to define an eighth channel section, a portion of the sheet and the sixth bend and the sixth channel section and the eighth bend and the eighth channel section defining a third channel of the second three channel structure.

30. A soley-bent baffle as recited in claim 29, wherein:

each of the planar flow control sheet and the channels is fabricated from stainless steel.

31. A baffle for controlling flow of a liquid in a flow path in a basin, the flow path defining a flow perimeter, the baffle comprising:

a planar sheet having a continuous edge corresponding to the flow perimeter, the continuous edge being configured with at least one linear side and at least one linear end;

a plurality of channels, each of the channels being soley-defined by channel sections and a series of bends integral with the channel sections;

a first of the channels being integral with a separate respective one of the linear sides;

a second of the channels being integral with a separate respective one of the linear ends;

a first of the bends being co-extensive and integral with the respective one of the sides and being integral with a first of the channel sections;

a second of the bends being integral with the first channel section and with a second of the channel sections;

a third of the bends being co-extensive and integral with the respective one of the ends and being integral with a third of the channel sections;

a fourth of the bends being integral with the third channel section and with a fourth of the channel sections;

the first and second channel sections extending to a corner;

the third and fourth channel sections extending at right angles with respect to each other;

the fourth channel section terminating at a location adjacent to both the first channel section and the corner, and the third channel section terminating at a location offset from the corner.

32. A baffle as recited in claim 31, wherein:

each of the planar sheet and the channels and the bends is fabricated from stainless steel.

33. A baffle as recited in claim 31, wherein:

the third channel section is provided with a cutout extending from the corner to the location offset from the corner;

the fourth channel section extends into the cutout.

* * * * *

UNITED STATES PATENT AND TRADEMARK OFFICE
CERTIFICATE OF CORRECTION

PATENT NO. : 6,783,009 B1  Page 1 of 1
APPLICATION NO. : 10/154902
DATED : August 31, 2004
INVENTOR(S) : C. L. Meurer It is certified that error appears in the above-identified patent and that said Letters Patent is hereby corrected as shown below:

Delete Fig. 11A, and insert Fig. 11A as shown.

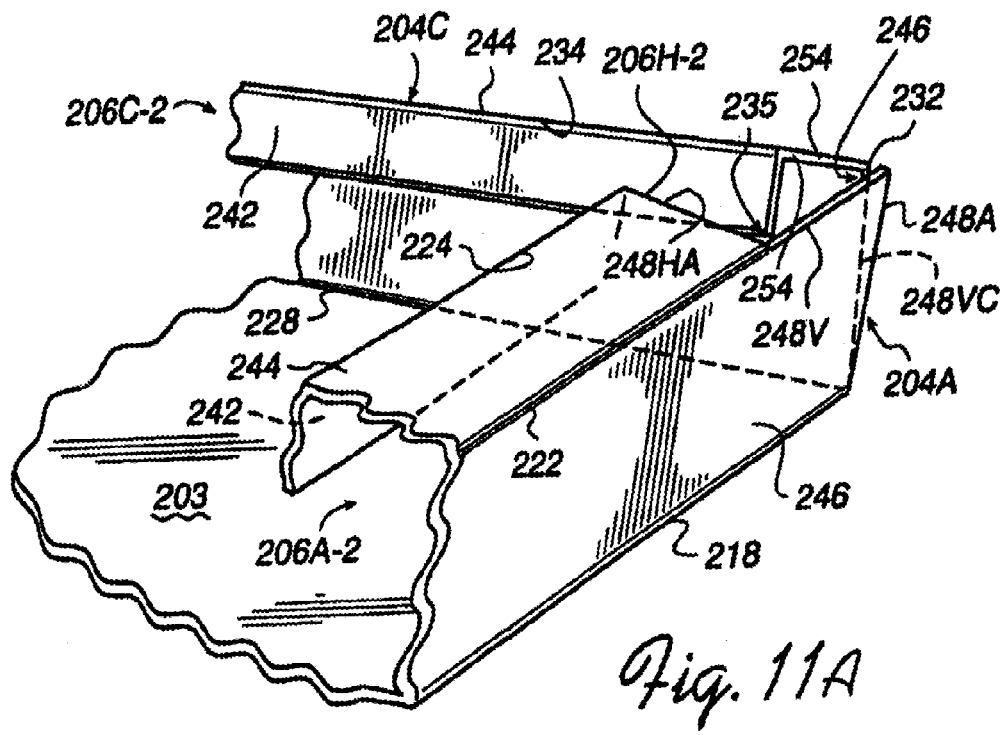

Signed and Sealed this

Thirteenth Day of May, 2008

JON W. DUDAS
*Director of the United States Patent and Trademark Office*